US009317232B2

(12) United States Patent
Kawaura et al.

(10) Patent No.: US 9,317,232 B2
(45) Date of Patent: Apr. 19, 2016

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventors: Toshinori Kawaura, Kawasaki (JP); Masakazu Nomoto, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 52 days.

(21) Appl. No.: 14/470,320

(22) Filed: Aug. 27, 2014

(65) Prior Publication Data

US 2014/0368881 A1 Dec. 18, 2014

Related U.S. Application Data

(62) Division of application No. 12/905,997, filed on Oct. 15, 2010, now abandoned.

(30) Foreign Application Priority Data

Oct. 30, 2009 (JP) ................................ 2009-250921

(51) Int. Cl.
G06F 3/12 (2006.01)
H04N 1/00 (2006.01)
G06F 9/445 (2006.01)

(52) U.S. Cl.
CPC .............. *G06F 3/123* (2013.01); *G06F 3/1204* (2013.01); *G06F 3/1211* (2013.01); *G06F 3/1225* (2013.01); *G06F 3/1231* (2013.01); *G06F 3/1285* (2013.01); *G06F 3/1287* (2013.01); *G06F 9/44505* (2013.01); *H04N 1/00222* (2013.01); *H04N 1/00244* (2013.01); *H04N 1/00474* (2013.01); *H04N 1/00413* (2013.01); *H04N 2201/0082* (2013.01); *H04N 2201/0094* (2013.01)

(58) Field of Classification Search
None
See application file for complete search history.

(56) References Cited

U.S. PATENT DOCUMENTS

| 5,636,332 | A | 6/1997 | Hibino |
| 6,965,958 | B1 | 11/2005 | Sugiyama |
| 2006/0293765 | A1 | 12/2006 | Tanaka et al. |
| 2006/0294492 | A1 | 12/2006 | Sakai |
| 2008/0068647 | A1 | 3/2008 | Isobe et al. |
| 2009/0051960 | A1 | 2/2009 | Maglanque et al. |

FOREIGN PATENT DOCUMENTS

| JP | 2005-85132 A | 3/2005 |
| JP | 2010-244453 A | 10/2010 |

OTHER PUBLICATIONS

Office Action issued on Oct. 15, 2013, in counterpart Japanese Application No. 2009-250921.

*Primary Examiner* — King Poon
*Assistant Examiner* — Vincent Peren
(74) *Attorney, Agent, or Firm* — Carter, DeLuca, Farrell & Schmidt, LLP

(57) ABSTRACT

An information processing apparatus which has a display device includes a display control unit and a launching unit. The display control unit may cause the display device to display a device management screen corresponding to an image processing apparatus. The launching unit may input identification information indicating launching in response to an instruction via the device management screen to an application associated with the image processing apparatus. In addition, the launching unit may launch the application associated with the device management screen according to the instruction input via the device management screen displayed on the display device by the display control unit.

15 Claims, 26 Drawing Sheets

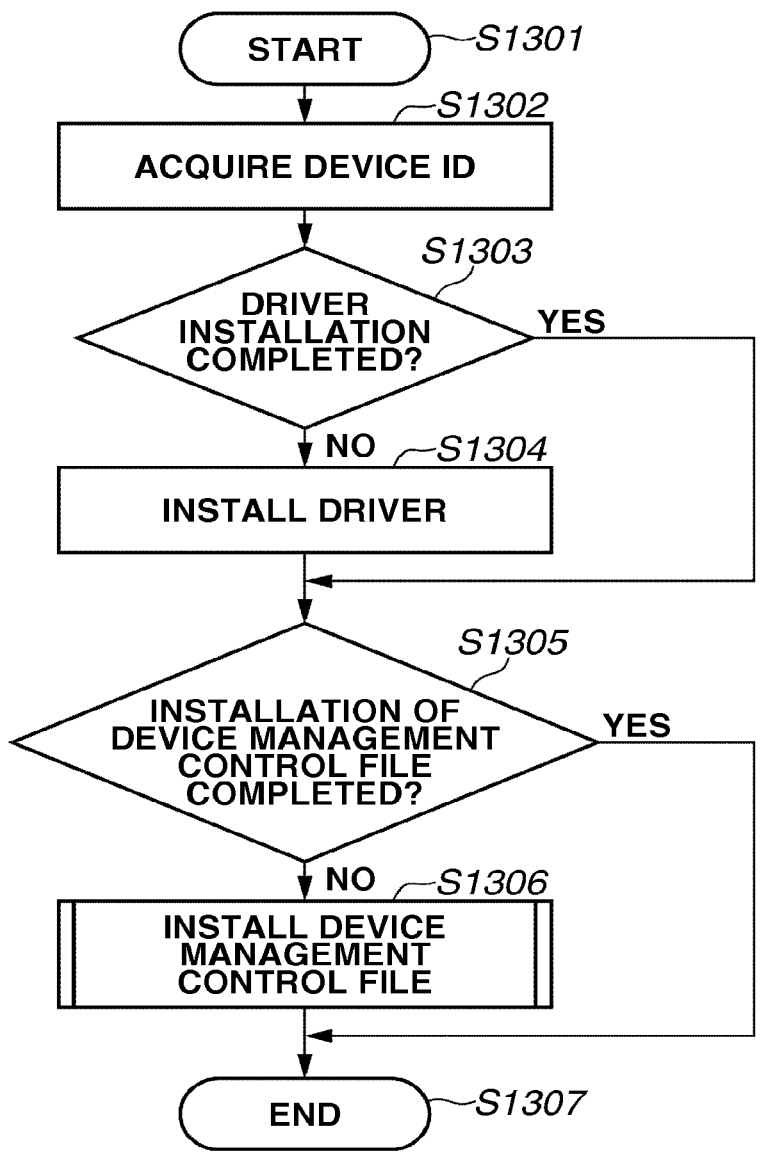

FIG.7

```xml
<?xml version="1.0"encoding="utf-8"?>
<dm:deviceManagement xmlns:dm="http://abc.xxx/dm/control">
   <dm:manufacturer>ABC</dm:manufacturer>            ~801
   <dm:model>Kmmn</dm:model>                          ~802
   <dm:functions>                                     ~803
      <dm:function>                                   ~804
         <dm:name xml:lang="en-US">Open Print Queue</dm:name>  ~805
<dm:execute>openPrinterQueue</dm:execute>             ~806
      </dm:function>
      <dm:function>
         <dm:name xml:lang="en-US">Printing Preferences</dm:name>  ~807
<dm:execute>printingPreferences</dm:execute>          ~808
      </dm:function>
      <dm:function>
         <dm:name xml:lang="en-US">Show Ink Level</dm:name>  ~809
         <dm:execute>                                 ~810
            rundll32 StatusMonitor.dll,FunctionEntry DeviceFriendlyName;1;100
         </dm:execute>
      </dm:function>
      <dm:function>
         <dm:name xml:lang="en-US">Show Device Status</dm:name>  ~811
         <dm:execute>                                 ~812
            rundll32 StatusMonitor.dll,FunctionEntry DeviceFriendlyName;2;100
         </dm:execute>
      </dm:function>
      <dm:function>
         <dm:name xml:lang="en-US">Launch Application A</dm:name>  ~813
         <dm:execute>                                 ~814
            %ProgramFiles%¥ABC¥ApplicationA.exe /devmng /devname
         </dm:execute>
      </dm:function>
   </dm:functions>
</dm:deviceManagement>
```

```
<?xml version="1.0"encoding="utf-8"?>
<dm:deviceManagement xmlns:dm="http://abc.xxx/dm/control">
  <dm:manufacturer>ABC</dm:manufacturer>
  <dm:model>Kmmn</dm:model>
  <dm:functions>
    ...
    <dm:function>
      <dm:request exist="FALSE">          ~1201
        <dm:name xml:lang="en-US">Lanch Application A</dm:name>
        <dm:execute>
          %ProgramFiles%¥ABC¥ApplicationA.exe /devmng /devname
        </dm:execute>
      </dm:request>
    </dm:function>
    <dm:function>
      <dm:request exist="TRUE" elevation="admin">  ~1202
        <dm:name xml:lang="en-US">
          Lanch Application A (Administrator rights is necessary)
        </dm:name>
        <dm:execute> ~1203
          %ProgramFiles%¥ABC¥ApplicationA.exe /devmng /devname /admin
        </dm:execute>
      </dm:request>
    </dm:function>
    <dm:function>
      <dm:request exist="TRUE" taskdisable="TRUE" />  ~1204
    </dm:function>
    ...
  </dm:functions>
</dm:deviceManagement>
```

FIG.15
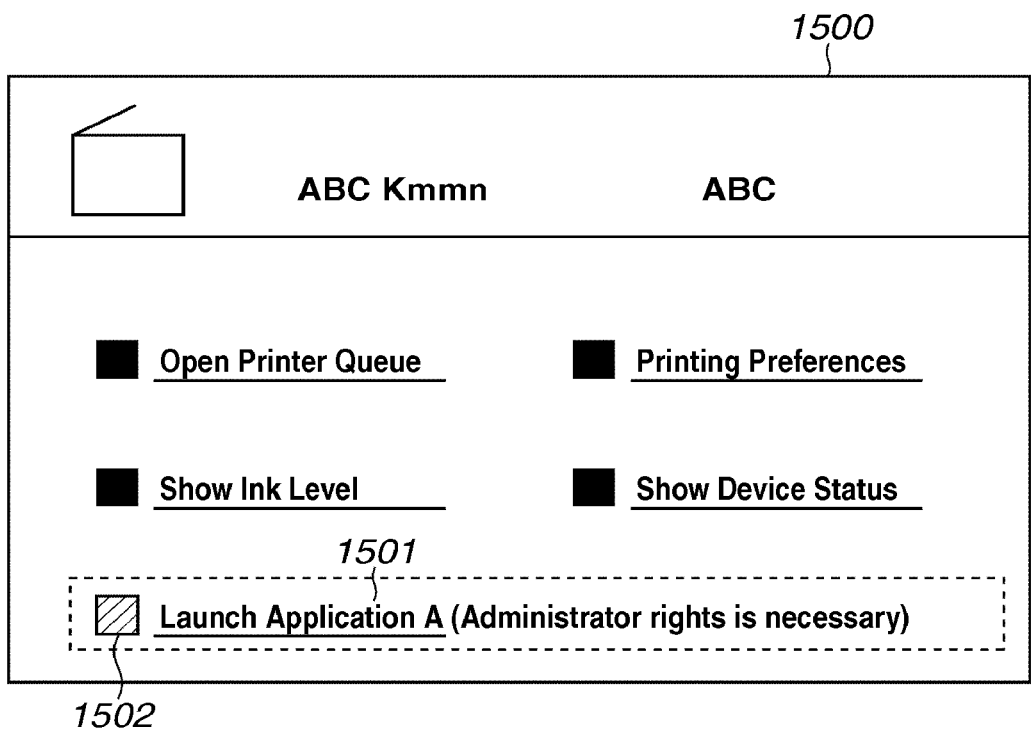
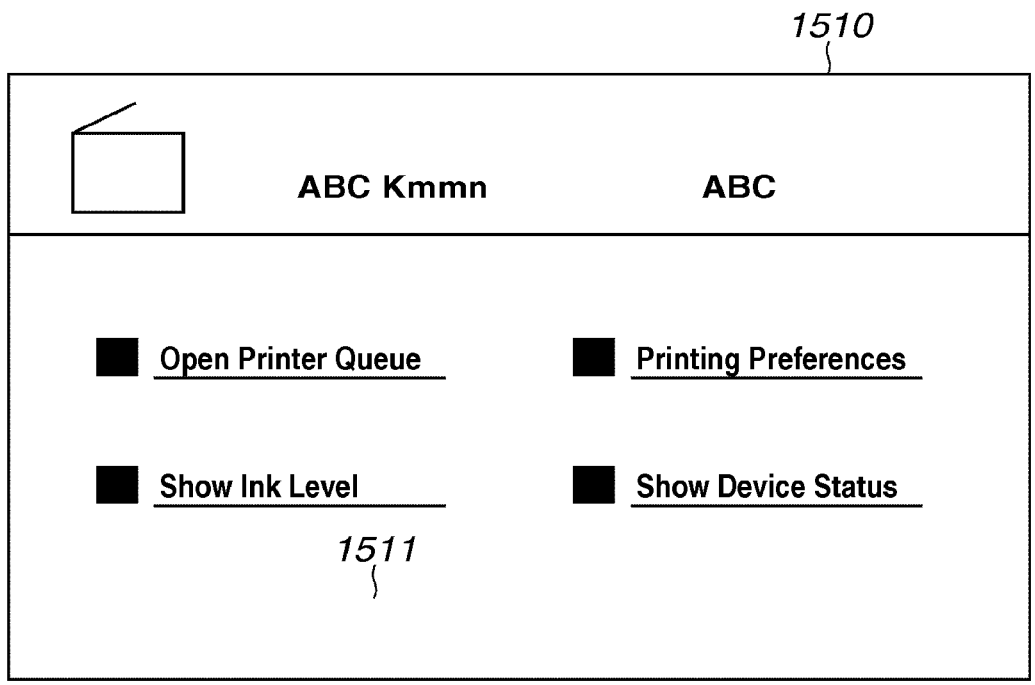

```
<?xml version="1.0"encoding="utf-8"?>
<dm:deviceManagement xmlns:dm="http://abc.xxx/dm/control">
  <dm:manufacturer>ABC</dm:manufacturer>
  <dm:model>Kmmn</dm:model>
  <dm:functions>
    . . .
    <dm:function>
      <dm:request photoprint="TRUE">  ~1601
        <dm:name xml:lang="en-US">Print Photos</dm:name>~1602
        <dm:execute>~1603
          %ProgramFiles%¥ABC¥ApplicationA.exe /photo /devmng /devname
        </dm:execute>
      </dm:request>
    </dm:function>
    <dm:function>
      <dm:request album="TRUE">~1604
        <dm:name xml:lang="en-US">Create Album</dm:name>~1605
        <dm:execute>~1606
          %ProgramFiles%¥ABC¥ApplicationA.exe /album /devmng /devname /admin
        </dm:execute>
      </dm:request>
    </dm:function>
    . . .
    <dm:function>
      <dm:name xml:lang="en-US">Launch Application A</dm:name>~1607
        <dm:execute>~1608
          %ProgramFiles%¥ABC¥ApplicationA.exe /devmng /devname
        </dm:execute>
      </dm:request>
    </dm:function>
    . . .
  </dm:functions>
</dm:deviceManagement>
```

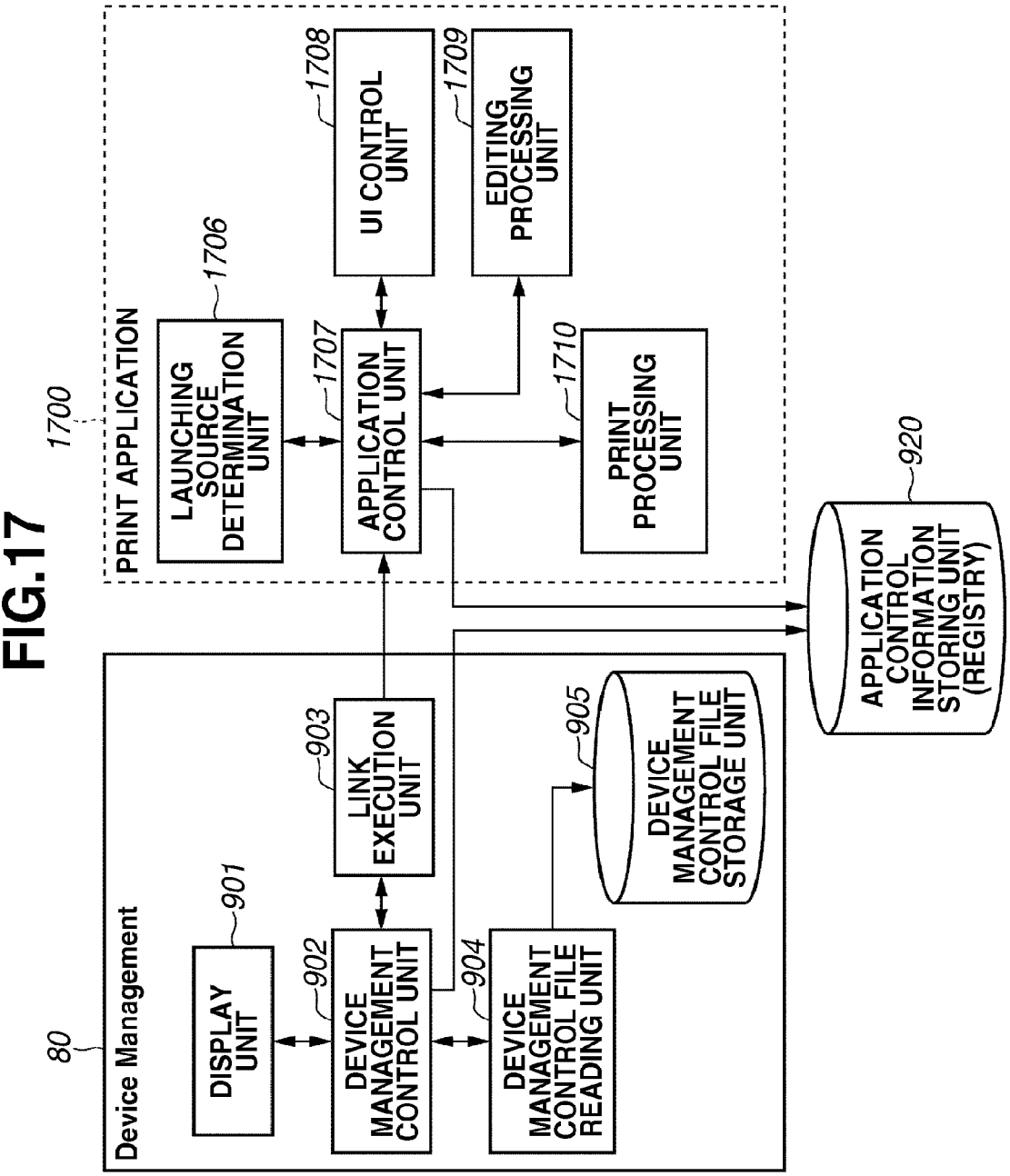

INFORMATION PROCESSING APPARATUS, INFORMATION PROCESSING METHOD, AND PROGRAM

CROSS REFERENCE TO RELATED APPLICATIONS

This application is a divisional of U.S. Patent application Ser. No. 12/905,997, filed Oct. 15,2010, which claims the benefit of and priority to Japanese Patent Application No. 2009-250921, filed Oct. 30, 2009, the entire contents of each of which are hereby incorporated by reference herein in their entirety.

BACKGROUND OF THE INVENTION

1. Field of the Invention

The present invention relates to an information processing apparatus, an information processing method, and a program.

2. Description of the Related Art

A peripheral apparatus control system enables a personal computer (hereinafter, referred to as "PC") user to access a peripheral apparatus via an appropriate interface, such as Universal Serial Bus (USB), Ethernet (registered trademark), or wireless local area network (LAN). PC users can effectively use this kind of control system for various purposes in their houses and offices. An example of the peripheral apparatus is, for example, a printer, a copying machine, a facsimile machine, a scanner, a digital camera, or combinations of these devices or functions thereof.

Windows (registered trademark) 7, which is provided by Microsoft Corporation, includes newly introduced functions to manage peripheral apparatuses connected to a PC. For example, "Devices and Printers" is a window that displays a peripheral apparatus (or a plurality of apparatuses) connected to the PC. "Device Stage (registered trademark)" is a visual screen that displays a link to a unique application or service provided by each apparatus. Therefore, PC users can easily access and use various functions and services relating to respective peripheral apparatuses.

Conventionally, transmission of a print instruction from a Windows (registered trademark) application to a peripheral apparatus, e.g., a printer, a scanner, a copying machine, or a multifunction peripheral, has been performed according to the following procedure. More specifically, as discussed in Japanese Patent Application Laid-Open No. 2005-85132, the procedure includes enabling a user to select an apparatus as an output destination after launching an application and perform input and output operations for the selected peripheral apparatus.

For example, there is an application (hereinafter, referred to as a "recovery application") capable of recovering settings of an information processing apparatus that relate to an output destination apparatus. If there is a plurality of printer icons created for a single output destination apparatus, the recovery application can delete unnecessary printer icon (s) other than a target printer icon that a user wants to use. However, in a case where various applications are launched from the "Device Stage", it is doubtless that a user wants to use a printer icon associated with the "Device Stage." Therefore, when a user uses a print application launched from the "Device Stage", it is rare that the user operates a wrong printer icon. Accordingly, the recovery application launched from the "Device Stage" is not required to perform processing for deleting other printer icons.

SUMMARY OF THE INVENTION

The present invention is directed to a technique capable of preventing processing of each application from being uselessly performed.

According to an aspect of the present invention, an information processing apparatus having a display device includes a display control unit and a launching unit. The display control unit may cause the display device to display a device management screen corresponding to an image processing apparatus. The launching unit may input identification information indicating launching in response to an instruction via the device management screen to an application associated with the image processing apparatus. In addition, the launching unit may launch the application associated with the device management screen according to the instruction input via the device management screen displayed on the display device by the display control unit.

Exemplary embodiments of the present invention can prevent the processing of each application from being uselessly performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating an example of processing that can be started when a multifunction peripheral (MFP) (or a printer) is connected to a PC via a network or a USB interface, according to the exemplary embodiment of the present invention.

FIG. 7 illustrates an example of a device management control file.

FIG. 14 illustrates an example of a device management control file.

FIG. 15 illustrates an example of a device management screen according to the exemplary embodiment of the present invention.

FIG. 16 illustrates an example of a device management control file.

FIG. 17 illustrates an example of a functional configuration including a device management and a print application according to the exemplary embodiment of the present invention.

DESCRIPTION OF THE EMBODIMENTS

Various exemplary embodiments, features, and aspects of the invention will be described in detail below with reference to the drawings.

In the following exemplary embodiment, it is assumed that a "Devices and Printers" screen (see FIG. 5A) can be displayed when it is selected from a "start menu" screen of the Windows. Further, a "Device Stage" screen (see FIG. 5B) of each apparatus can be opened when it is selected from the "Devices and Printers" screen.

For example, in a case where the selected apparatus is a printer, the "Device Stage" screen can display a link to an application that enables a user to open photos or documents to display or print. Further, the "Device Stage" screen can display a link to a status monitor that displays information indicating an operational state of an apparatus (e.g., a printer or a scanner) on a display device (e.g., liquid crystal display device (LCD) 206). Further, widespread use of the internet enables a user to use various online services via the internet by connecting information processing apparatuses and peripheral apparatuses. For example, if the "Device Stage" screen provides a link to a support site on the internet that is provided by a manufacturer of an apparatus, a user can easily access the intended site relating to his/her apparatus.

Figure 1:
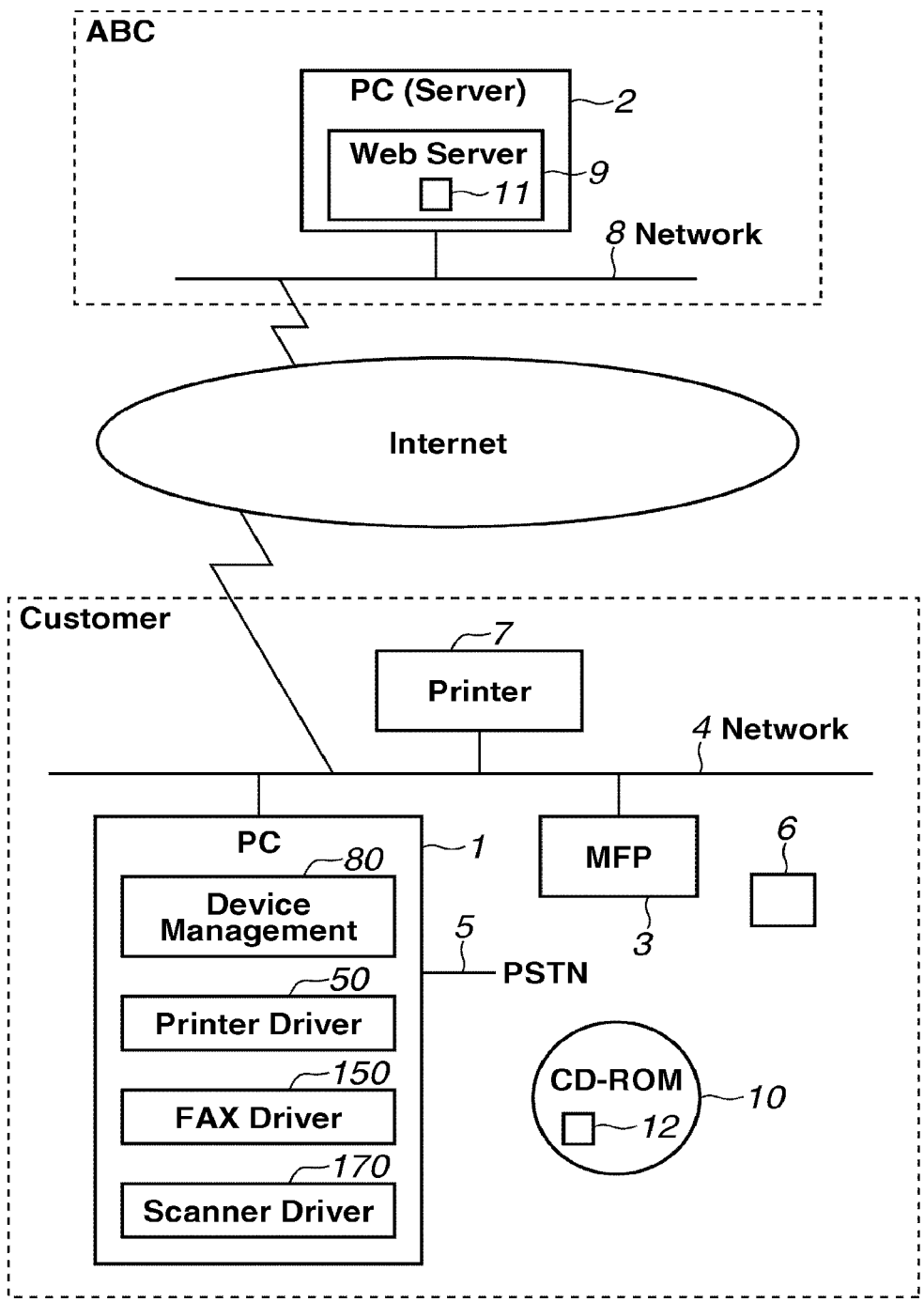
FIG. 1 illustrates an example of a peripheral apparatus control system including an information processing apparatus and a peripheral apparatus according to an exemplary embodiment of the present invention.
Figure 2A:
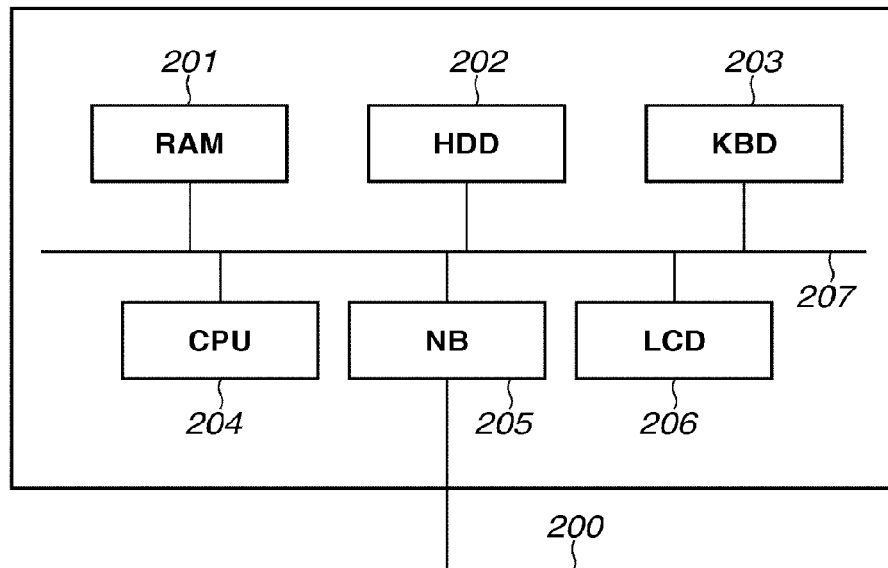
FIGS. 2A and 2B illustrate an example of a hardware configuration of each apparatus constituting the peripheral apparatus control system according to the exemplary embodiment of the present invention.

FIG. 1 illustrates an example of a peripheral apparatus control system including an information processing apparatus and a peripheral apparatus. The peripheral apparatus control system illustrated in FIG. 1 includes two information processing apparatuses 1 and 2 which can be constituted by general PCs. FIG. 2A illustrates an example hardware configuration of the PC 1 and the PC 2 on which Windows7 or its equivalent is installed as on Operating System (OS). The PC 1 and the PC 2 are respectively connected to a network 4 and a network 8 that are constituted by Ethernet (registered trademark).

Figure 2B:
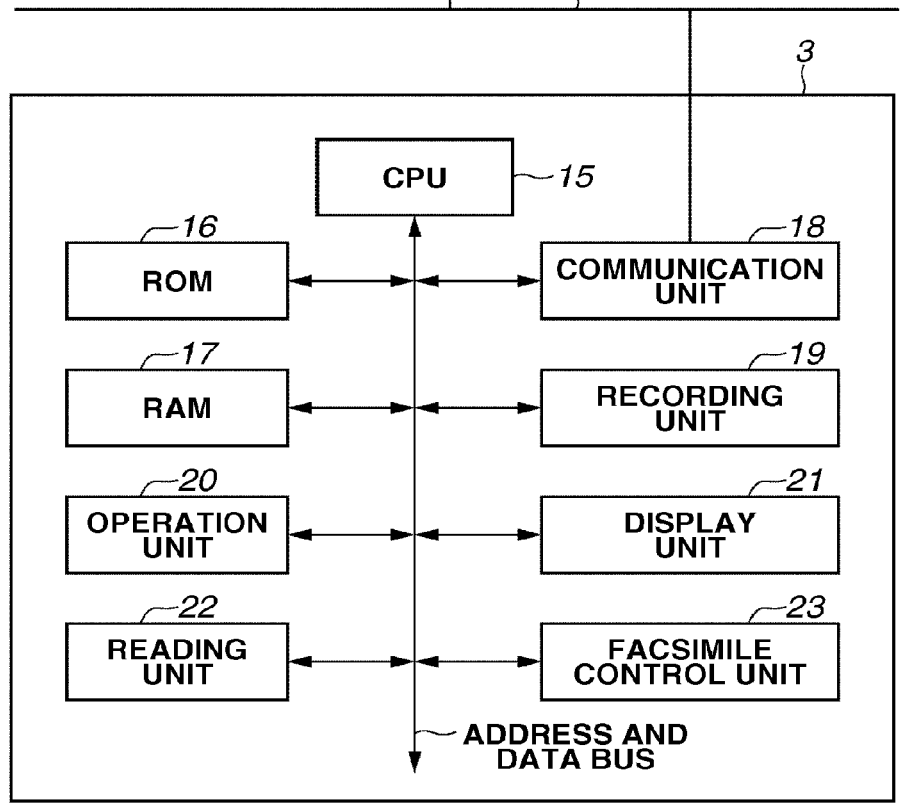

A multifunction printer (hereinafter, referred to as "MFP") 3 can be constituted by a color inkjet printer, a color facsimile machine, or a color scanner. The MFP 3 is an example of the peripheral apparatus according to the present exemplary embodiment. The MFP 3 has a model name "Kmmn" which is manufactured by ABC Corporation. The peripheral apparatus (i.e., an image processing apparatus) according to the present exemplary embodiment is not limited to the MFP and can be constituted by a printer, a copying machine, a facsimile machine, a scanner, a digital camera, or any other apparatus having comparable functions. FIG. 2B illustrates an example of a hardware configuration of the MFP 3. The MFP 3 is connected to the PC 1 via the network 4 to perform bi-directional communications.

The PC 1 includes an application 80 which can be constituted by an executable file (*.EXE) for Windows. As an example function relating to the present exemplary embodiment, the application 80 can display device management screens illustrated in FIGS. 5A and 5B. The PC 1 further includes a printer driver 50 (see FIG. 4) and a FAX driver 150.

The PC 1 further includes a scanner driver 170. The network 4 is a private network constructed in a house of a user (i.e., a client) who uses the MFP 3. The MFP 3 is connected to the PC 1 via the network 4 and can be commonly used among a plurality of users in the house. The network 8 is an office network constructed in the building of ABC Corporation. The PC 2 connected to the network 8 includes a web server 9 that provides a web site of ABC Corporation via the internet.

A compact disk read only memory (CD-ROM) 10 is a portable storage medium that can be inserted into the PC 1. The CD-ROM 10 can store software programs and electronic files. Control files (data) to be used in device management (hereinafter, referred to as device management control files 11 and 12 are respectively distributed from the web server 9 and the CD-ROM 10. The PC 1 can use an analog telephone line 5 for facsimile transmission or reception. A flash memory 6 can be inserted into a dedicated slot (not illustrated) of the MFP 3 as a storage that can be referred to by the PC 1.

A printer 7 has a model name "Defg" which is manufactured by XYZ Corporation. The printer 7 is a device different from the MFP 3 in type. For example, the printer 7 may be a laser printer having a single function or an inkjet printer. A print engine may be any one of an inkjet type, an electrophotographic type, a color type, or a monochrome type.

FIGS. 2A and 2B illustrate an example of a hardware configuration of each apparatus constituting the peripheral apparatus control system. FIG. 2A is a block diagram illustrating an example of a hardware configuration of the PC.

Each of the PC 1 and the PC 2 has the hardware configuration illustrated in FIG. 2A. Hereinafter, the hardware configuration of the PC 1 is described below with reference to FIG. 2A.

As illustrated in FIG. 2A, the PC 1 includes a random access memory (RAM) 201, a hard disk drive (HDD) 202 serving as a storage unit, a keyboard (KBD) 203 serving as an input unit, and a central processing unit (CPU) 204 serving as a control unit. The PC 1 further includes a liquid crystal display device (LCD) 206 serving as a display unit, a network board (NB) 205 serving as a communication control unit, and a bus 207 that connects the above described functional units of the PC 1. The HDD 202 can be replaced with a portable CD-ROM or a built-in ROM that can also serve as a storage unit.

An application such as the device management 80 and respective modules (software programs) illustrated in FIG. 3, FIG. 4, FIG. 10, and FIG. 15 can be stored in the HDD 202. The CPU 204 can execute each module (software program) loaded into the RAM 201 from the HDD 202, if necessary. Therefore, the CPU 204 can realize functions of the application such as the device management 80 and various functions of respective modules (software programs) illustrated in FIG. 3, FIG. 4, FIG. 10, and FIG. 15.

FIG. 2B illustrates an example of a hardware configuration of the MFP. The MFP 3 has the hardware configuration illustrated in FIG. 2B. The MFP 3 illustrated in FIG. 2B includes a CPU 15 that can be constituted by a microprocessor. The CPU 15 which is capable of serving as a central processing unit of the MFP 3 can control a RAM 17, a communication unit 18, a recording unit 19, an operation unit 20, a display unit 21, a reading unit 22, and a facsimile control unit 23 according to programs stored in a ROM 16. The ROM 16 stores software programs that cause the MFP 3 to perform recording (printing) processing under the control of the printer driver 50 (see FIG. 4) and perform processing for transmitting information indicating an operational state of the MFP 3 to the PC 1.

The RAM 17 temporarily stores print data which are mainly transmitted from the PC 1. The recording unit 19 performs printing based on the print data stored in the RAM 17. Further, the RAM 17 temporarily stores image data read by the reading unit 22, facsimile transmission data received from the PC 1, and facsimile reception data received by the facsimile control unit 23. The communication unit 18 includes a connection port for the network 4 and a connection port for the analog telephone line 5. The communication unit 18 controls analog communications, such as Ethernet and facsimile communications.

The recording unit 19 includes a recording unit and an electric circuit. The recording unit includes an inkjet type recording head, color ink tanks, a carriage, and a recording sheet conveyance mechanism. The electric circuit, such as an application specific integrated circuit (ASIC), controls the recording head to generate pulses for printing based on the print data. When a user performs a printing operation or a facsimile transmission operation via a print application, contents (image data) of a displayed file that is opened by the application are temporarily stored, as a spool file, in the HDD 202 of the PC 1.

The stored spool file data is, for example, print command type data or intermediate drawing command type (enhanced metafile (EMF) type) data which can be interpreted by a printing apparatus. Then, pieces of the image data are converted via the printer driver 50 or the FAX driver 150 into print data or facsimile transmission data including a command for controlling the MFP 3, and then transmitted via the network 4 to the MFP 3. When the MFP 3 receives the print data, the recording unit 19 converts the received print data into pulses for printing and prints an image on a recording sheet. When the MFP 3 receives the facsimile transmission data, the facsimile control unit 23 converts the received facsimile transmission data into facsimile communication protocols and transmits the converted data to a facsimile machine of a transmission destination via the analog telephone line 5.

The operation unit 20 includes a power button, a reset button, and other various buttons which enable a user to operate the MFP 3. The display unit 21 is, for example, constituted by a touch panel liquid crystal display device. The display unit 21 can display an operational state of the MFP 3 and various setting information and telephone numbers, and can receive input by the user. The reading unit 22 includes a color image sensor and an electric circuit constituted by ASIC for image processing. The facsimile control unit 23 is constituted by a facsimile modem or an analog communication circuit. The facsimile control unit 23 controls transmission and reception of facsimile data according to facsimile communication protocols.

The apparatus illustrated in FIG. 2A can communicate with the MFP 3 illustrated in FIG. 2B via a network 200. The network 200 is a network constituted by at least one of the network 8, the internet, and the network 4 or by a combination thereof.

Figure 3:
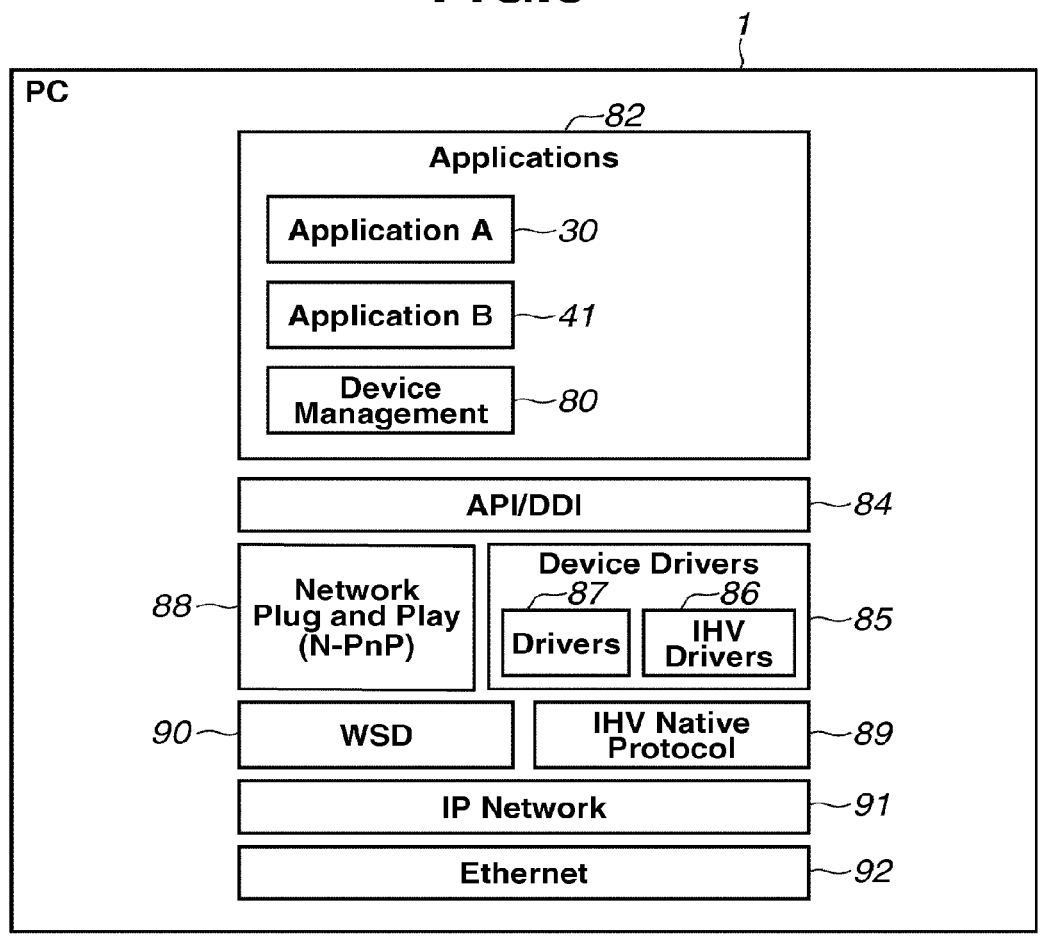
FIG. 3 illustrates an example of a software configuration of a personal computer (PC) according to the exemplary embodiment of the present invention.

FIG. 3 illustrates an example of a software configuration of the PC 1 which includes an Ethernet control stack 92, an internet protocol (IP) Network control stack 91, a Web Services on Devices (WSD) control stack 90, an Independent Hardware Vendor (IHV) native protocol control stack 89, and a Network Plug and Play (N-PnP) control stack 88. The Ethernet control stack 92 can control the Ethernet. The IP Network control stack 91 can control the IP Network. The WSD control stack 90 can control the web services on devices. The IHV native protocol control stack 89 can control unique protocols of the independent hardware vendor. The N-PnP control stack 88 can control the Network Plug and Play (hereinafter, referred to as "N-PnP").

For providing a support for network connection devices, Windows Vista OS includes an extended plug and play function, which is referred to as "Plug and Play Extensions" (PnP-X), as an initially installed standard function.

However, the "N-PnP" function is used in the present exemplary embodiment which is a function comparable to the PnP-X function. A device driver group 85 includes a standard driver group 87 incorporated as standard software programs in a program package for the OS, and an IHV-made driver group 86 that can be provided from the IHV. An application/device driver interface (DDI) interface 84 includes an Application Programming Interface (API) and a Device Driver Interface (DDI).

The application for device management 80 (hereinafter, referred to as "device management 80") is a standard software program incorporated in the program package for the OS. A recovery application 30 is described below with reference to FIG. 4. The recovery application 30 is an example application that is associated with the image processing apparatus. A print application 41 is described below with reference to FIG. 4. An application group 82 includes the device management 80, the recovery application 30, and the print application 41. The device management 80 manages and executes a "Devices and Printers" folder 500 illustrated in FIG. 5A and a device management screen 550 illustrated in FIG. 5B. The software configuration of the PC 1 illustrated in FIG. 3 is applicable to the PC illustrated in FIG. 1, and the PC 1 and the PC 2 illustrated in FIG. 1.

Figure 4:
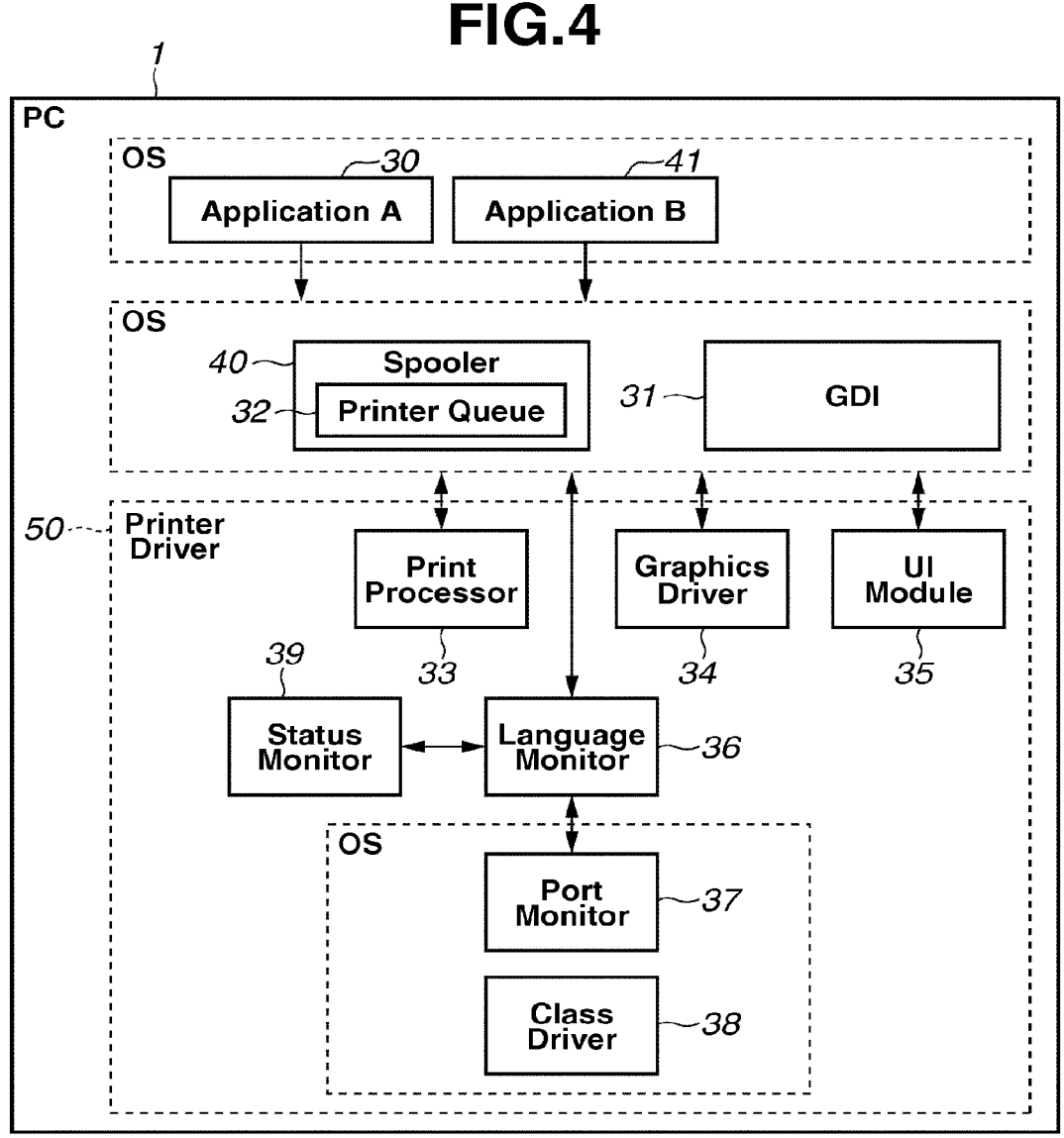
FIG. 4 illustrates an example configuration of a printer driver of the PC according to the exemplary embodiment of the present invention, which is differently illustrated compared to the configuration in FIG. 3.

FIG. 4 illustrates an example configuration of a printer driver installed on the PC 1, which is differently illustrated compared to the configuration of FIG. 3. In FIG. 4, the printer driver 50 is a driver for the MFP 3 that is installed on the PC 1. The printer driver 50 includes a plurality of modules 33 to 36 and 39. The recovery application 30 is usable to appropriately change and set printer settings for the OS. Detailed processing of the recovery application 30 is described below with reference to FIG. 12 and FIG. 13. The print application 41 is, for example, an application that corresponds to a text editor or an image reviewing application, which are standard applications incorporated in the program package for the OS. The OS includes a Graphics Device Interface (GDI) 3.

A spooler 40 includes a printer queue 32 that performs queuing of print jobs. A printer queue folder displays the queued print jobs. A print processor 33 can change a print layout and can perform special processing on a printed image. A graphics driver 34 which serves as a core part of the printer driver 50 performs image processing for printing based on a drawing command transmitted from the GDI 31 and generates a print control command. A UI module 35 can provide a user interface of the printer driver 50 and can control the user interface.

A language monitor 36 which serves as a data communication interface (I/F) can control transmission and reception of data. A status monitor 39 can display an ink remaining amount of each ink usable by the MFP 3, and also display warning, error, and other states. A port monitor 37 can perform processing for receiving data from the language monitor 36 and transmitting the received data to an appropriate port. The port monitor 37 can further perform processing for receiving data from the MFP 3 via a class driver 38.

The class driver 38 is a low-level module closest to the port. In the present exemplary embodiment, the class driver 38 corresponds to a driver for a unique protocol (WSD or IHV) printer class, which controls the port (e.g., a network port in the present exemplary embodiment). The printer driver 50 is a driver provided by ABC Corporation, the manufacturer of the MFP 3.

The N-PnP control stack 88, the WSD control stack 90, the IP Network control stack 91, the Ethernet control stack 92, and the application/DDI interface 84 are modules provided by the OS. The GDI 31 illustrated in FIG. 4 partly corresponds to the application/DDI interface 84. More specifically, the GDI 31 is an interface that can be called by the application. The graphics driver 34 is functionally operable to convert data input via the GDI interface into a DDI command. The graphics driver 34 and the UI module 35 correspond to the standard driver group 87 and the N-PnP control stack 88 illustrated in FIG. 3. The IHV native protocol control stack 89 has a function that corresponds to the function of the port monitor 37 illustrated in FIG. 4, although it is a portion that the IHV can provide as an extension function of the OS.

Figure 5A:
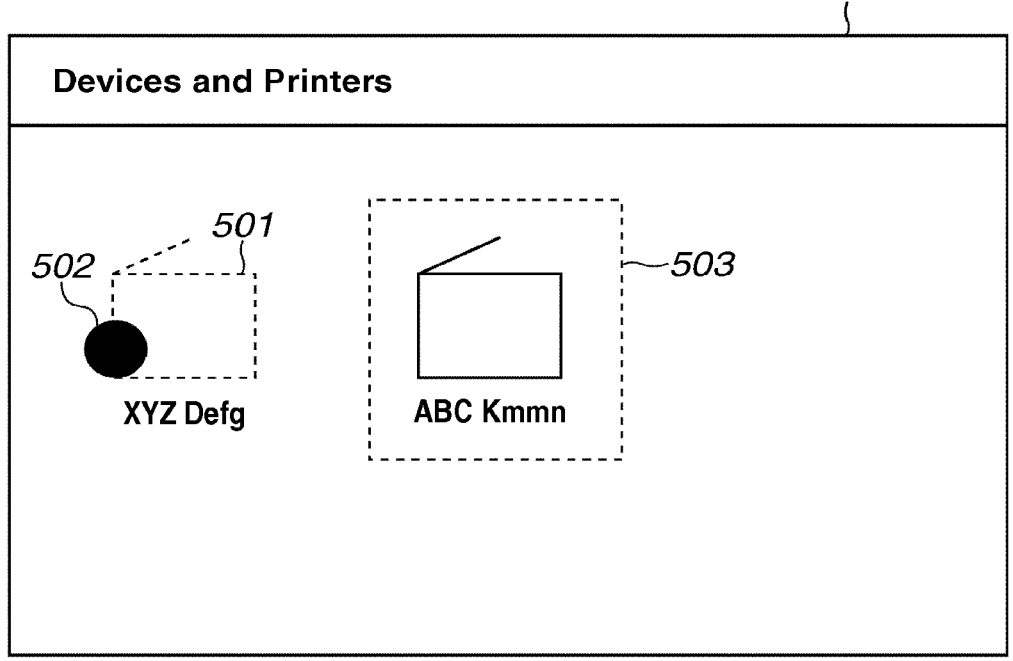
FIGS. 5A and 5B illustrate an example of a "Devices and Printers" screen and a device management screen according to the exemplary embodiment of the present invention.
Figure 5B:
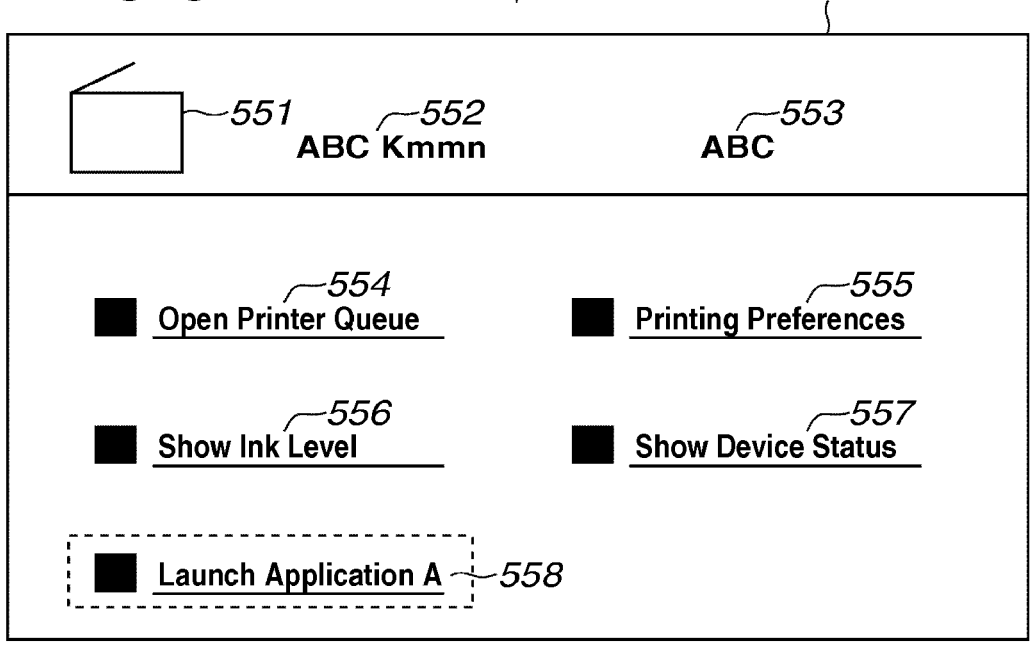

FIGS. 5A and 5B illustrate an example of the "Devices and Printers" screen and the device management screen, respectively. FIG. 5A illustrates an example of the Devices and Printers folder 500. The Devices and Printers folder 500 illustrated in FIG. 5A can be displayed on the PC 1. The Devices and Printers folder 500 indicates driver icons of printers and facsimile machines that are usable by the PC 1.

In the present exemplary embodiment, a device 501 named as "XYZ Defg" and a device 503 named as "ABC Kmmn" are printers currently available for the PC 1. A default mark 502 is a mark indicating a system default printer. Thus, FIG. 5A illustrates a state that the device 501 named as "XYZ Defg" is set as the default printer. If a user clicks on a symbol mark indicating the device 503 named as "ABC Kmmn" with a mouse or the like, the device management screen illustrated in FIG. 5B can be displayed.

FIG. 6 is a flowchart illustrating an example of processing to be started when the MFP 3 (or printer) is connected to the PC 1 via a network or an USB interface. A program relating to processing illustrated in the flowchart in FIG. 6 (i.e., the device management 80) is stored in the HDD 202 and can be executed by the CPU 204 when the program is loaded into the RAM 201 from the HDD 202. The program (i.e., the device management 80) can be realized as an installation control program provided as a part of the OS or an application program.

In step S1301, the device management 80 starts processing according to the flowchart illustrated in FIG. 6 when the PC (e.g., the PC 1) is connected to a device (e.g., the MFP 3) via the network 4. In step S1302, the PC 1 acquires a device identification (ID) of the device (i.e., the MFP 3). The device ID acquired in step S1302 is, for example, "MFG:ABC; MDL:Kmmn;CLS:PRINTER;CMD:K4;DES:ABC Kmmn;", which is expressed using a character string. The PC 1 can acquire a device ID of any printer function of the MFP 3 from the MFP 3 via the network 4. The device ID includes the following information.
Manufacturer (MFG:): ABC
Model (MDL:): Kmmn
Class (CLS:): PRINTER
Command (CMD:): K4 (private command used for print control by ABC Corporation)
Description (DES:): ABC Kmmn Next, in step S1303, the device management 80 determines whether installation of the driver (e.g., the printer driver 50 and the FAX driver 150) is already completed. If it is determined that there is not any installed driver (NO in step S1303), then in step S1304, the device management 80 installs the driver (e.g., the printer driver 50 and the FAX driver 150). If the installation of the driver (e.g., the printer driver 50 and the FAX driver 150) is successfully completed, a printer mark corresponding to the newly installed driver is registered to the Devices and Printers folder 500 illustrated in FIG. 5A.

If it is determined that the driver (e.g., the printer driver 50 and the FAX driver 150) is already installed (YES in step S1303), the processing proceeds to step S1305.

Then, in step S1305, the device management 80 determines whether the device management control file (see FIG. 7) is not yet installed. To perform the determination processing in step S1305, the device management 80 can refer to manufacturer information (MFG:) and model information (MDL:) included in the device ID to check whether the installed device management control file matches with the driver (the printer driver 50 and the FAX driver 150).

Figure 8:
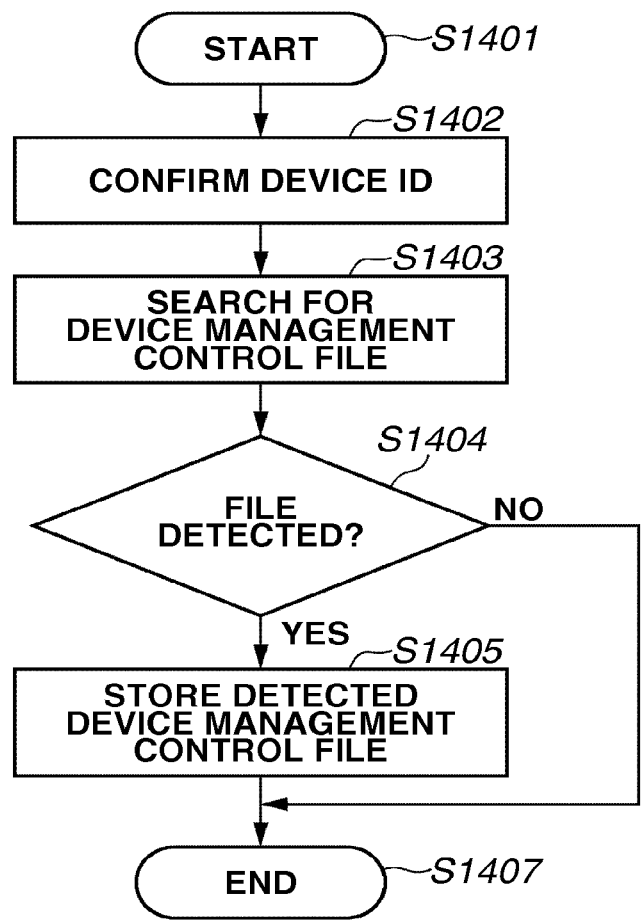
FIG. 8 is a flowchart illustrating an example of device management control file installation processing according to the exemplary embodiment of the present invention.

If it is determined that the installation of the control file is not yet completed (NO in step S1305), then in step S1306, the device management 80 executes processing for installing the device management control file as illustrated in FIG. 8 and completes the processing. If it is determined that the device management control file is already installed (YES in step S1305), then in step S1307, the device management 80 terminates the processing procedure illustrated in FIG. 6.

FIG. 8 is a flowchart illustrating an example of processing for installing the device management control file. A program relating to processing illustrated in the flowchart in FIG. 8 (i.e., the device management 80) is stored in the HDD 202 and can be executed by the CPU 204 when the program is loaded into the RAM 201 from the HDD 202. The program can be realized as an installation control program to be provided as a part of the OS or an application program.

When the device management 80 determines to execute the processing for installing the device management control file in step S1306 in FIG. 6, in step S1401 illustrated in FIG. 8, the device management 80 starts file installation processing First, in step S1402, the device management 80 confirms a device ID of the device (the MFP 3) connected via the network 4.

In step S1403, the device management 80 searches for a device management control file dedicated to the MFP 3, i.e., the device connected to the PC 1, based on the manufacturer information (MFG:) and the model information (MDL:) included in the device ID.

An example of a device management control file 800 illustrated in FIG. 7 includes descriptions relating to the device (the MFP 3). More specifically, the manufacturer (MFG:) "ABC" is included in an element 801 indicating a description <dm:manufacturer> and the model (MDL:) "Kmmn" is included in an element 802 indicating a description <dm:model>. The device management control file is an example of device management control data. The device management 80 searches for the device management control file dedicated to the device (i.e., the MFP 3) from among device management control files stored in the web server 9 or the CD-ROM 10 inserted in the PC 1 based on the information described in the elements 801 and 802.

In step S1404, the device management 80 determines whether a device management control file 11 or a device management control file 12 has been found. If it is determined that the device management control file 11 or the device management control file 12 is detected (YES in step S1404), then in step S1405, the device management 80 stores the detected device management control file in the HDD 202 of the PC 1. In step S1407, the device management 80 terminates the file installation processing illustrated in FIG. 8.

In the present exemplary embodiment, the device management 80 detects and installs the device management control file 800 that corresponds to the device (the MFP 3). If it is determined that neither the device management control file 11 nor the device management control file 12 has been detected (NO in step S1404), then in step S1407, the device management 80 terminates the processing procedure without installing any device management control file.

Figure 9:
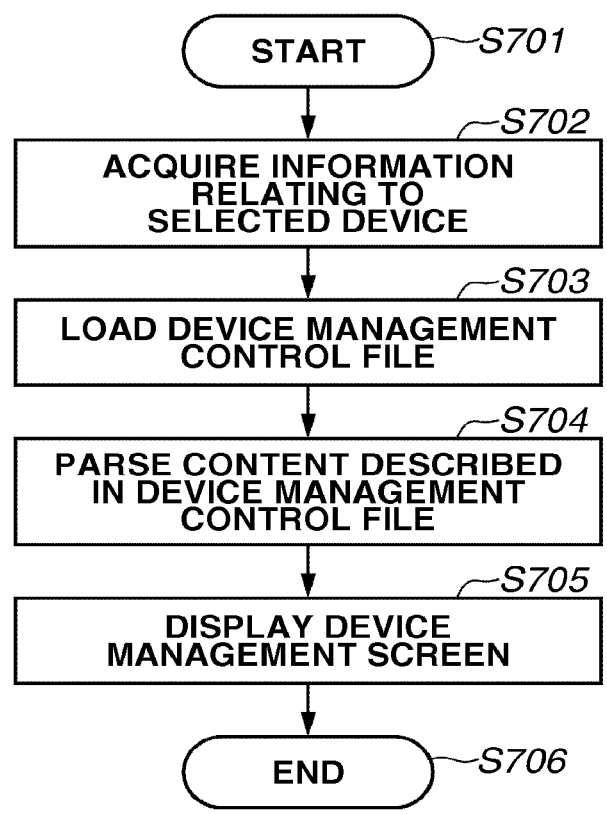
FIG. 9 is a flowchart illustrating an example of device management screen launch processing according to the exemplary embodiment of the present invention.

FIG. 9 is a flowchart illustrating an example of processing for launching a device management screen. A program relating to processing illustrated in the flowchart in FIG. 9 is stored in the HDD 202 and can be executed by the CPU 204 when the program is loaded into the RAM 201 from the HDD 202.

Figure 10:
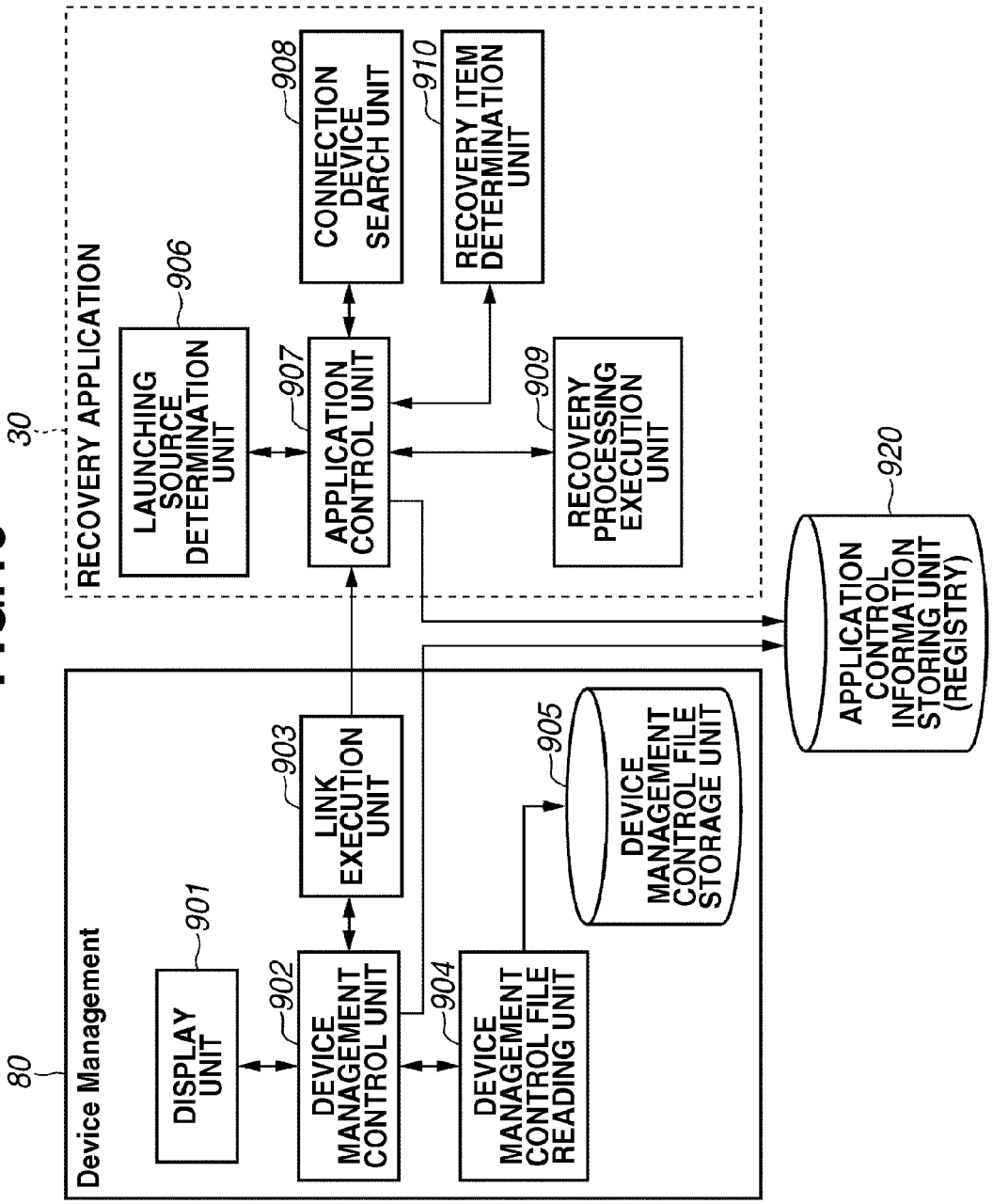
FIG. 10 illustrates an example of a functional configuration including a device management and a recovery application according to the exemplary embodiment of the present invention.

FIG. 10 illustrates an example of a software configuration of the device management 80 and the recovery application 30. A detailed configuration of FIG. 10 corresponds to a part of FIG. 3. The device management 80 includes a display unit 901, a device management control unit 902, a link execution unit 903, a device management control file reading unit 904, and a device management control file storage unit 905. The device management control file storage unit 905 stores the device management control file 800 which has been stored in step S1405 in FIG. 8.

The recovery application 30 includes a launching source determination unit 906, an application control unit 907, a connection device search unit 908, a recovery processing execution unit 909, and a recovery item determination unit 910. The device management screen 550 is launched and displayed when a device is selected from the Devices and Printers folder 500 illustrated in FIG. 5A. Here, a case in which the device selected from the folder illustrated in FIG. 5A is the device 503 and the device management screen 550 is launched as illustrated in FIG. 5B is described as an example.

In step S701, the device management 80 starts device management screen launch processing in response to selection of the device 503 from the Devices and Printers folder 500.

Next, in step S702, the device management control unit 902 acquires a device name of the device selected from the Devices and Printers folder 500. In the present exemplary embodiment, the device management control unit 902 acquires a device name "ABC Kmmn" of the selected device 503 as a control target device.

Next, in step S703, the device management control file reading unit 904 loads the device management control file based on the device name acquired in step S702. More specifically, the device management control file reading unit 904 loads the device management control file 800 stored in step S1405 illustrated in FIG. 8 based on the device name acquired in step S702.

Then, in step S704, the device management control file reading unit 904 analyzes a content described in the device management control file 800 illustrated in FIG. 7 and extracts (parses) required information. In step S705, the device management control unit 902 causes the display unit 901 to display the device management screen 550 according to the content of the data parsed by the device management control file reading unit 904. Then, in step S706, the device management control unit 902 terminates the processing procedure illustrated in FIG. 9.

The device management control file 800 illustrated in FIG. 7 includes, in addition to the above described element 801 <dm:manufacturer> and the element 802 <dm:model> that are information required in installation, information necessary to construct the device management screen 550.

The device management screen 550 includes an upper field in which a device icon 551, a device name 552, and manufacturer information 553 are displayed. The data of the device icon 551 is stored as a part of data stored in the device management control file storage unit 905, although not illustrated. Further, the displayed device name 552 is the name of the device 503 selected from the Devices and Printers folder 500. The displayed manufacturer information 553 is a character string designated in the element 801 <dm:manufacturer>.

The device management screen 550 includes a lower field in which links to various functions relevant to the device 503 are displayed. More specifically, a printer queue button 554, a print setting button 555, an ink remaining amount button 556, a device status button 557, and an application "A" launch button 558 are displayed. An element 803 indicating a description <dm:functions> illustrated in FIG. 7 includes five elements denoted by <dm:function> each describing a button and its function.

First, the first element <dm:function> is described in detail. An element 805 indicating a description <dm:name xml:lang="en-US">Open Printer Queue</dm:name> includes a character string "Open Printer Queue" to be displayed on the printer queue button 554. An element 806 indicating a description <dm:execute>open Printer Queue</dm:execute> includes a code "open Printer Queue" that represents a printer queue folder displaying function (program). Although not illustrated in the drawings, the printer queue folder has a function of displaying a state of a print job.

Therefore, in step S705, the device management control file reading unit 904 parses the element <dm:function> and the display unit 901 displays the character string described in the element 805 on the printer queue button 554 illustrated in FIG. 5B. If the printer queue button 554 is pressed, the function described in the element 806 is executed and, as a result, the printer queue folder is displayed.

Next, the second element <dm:function> is described in detail. An element 807 indicating a description <dm:name xml:lang="en-US">Printing Preferences</dm:name> includes a character string "Printing Preferences" to be displayed on the print setting button 555. An element 808 indicating a description <dm:execute>printing Preferences</dm:execute> includes a code "printing Preferences" that represents a print setting dialog displaying function (program). Although not illustrated, the print setting dialog is a print setting screen that can be provided by the UI module 35 of the printer driver 50.

Therefore, in step S705, the device management control file reading unit 904 parses the element <dm:function> and the display unit 901 displays the character string described in the element 807 on the print setting button 555 illustrated in FIG. 5B. If the print setting button 555 is pressed, the function described in the element 808 is executed and, as a result, the print setting dialog is displayed.

Descriptions for the third and fourth elements are omitted.

Next, the fifth element <dm:function> is described in detail. An element 813 indicating a description <dm:name xml:lang="en-US">Launch Application A</dm:name> includes a character string "Launch Application A" to be displayed on the application "A" launch button 558.

An element 814 indicating a description <dm:execute>%ProgramFiles%YABCYApplication A.exe/devmng/devname</dm:execute> includes a code "%ProgramFiles%YABCYApplication A.exe/devmng/devname" that represents an application "A" (illustrated in FIG. 11A) launching function.

Figure 11A:
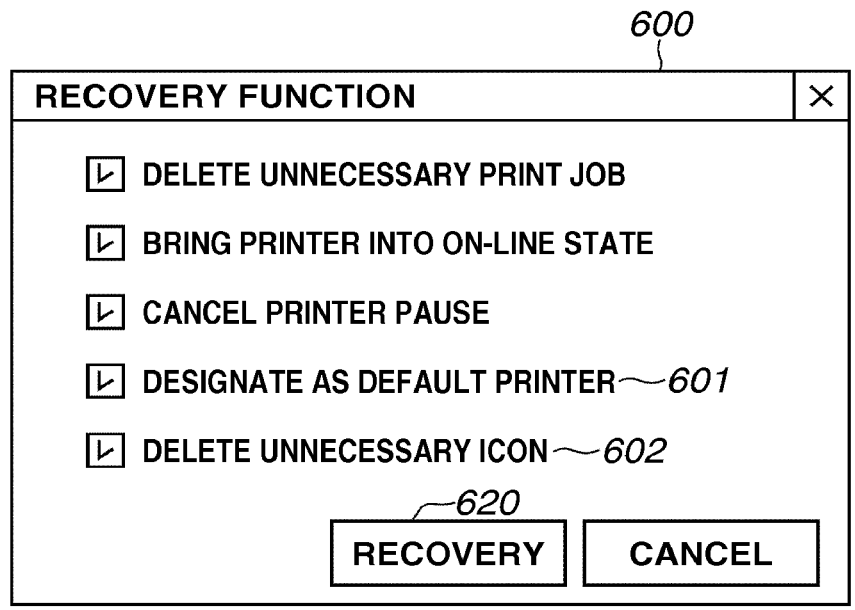
FIGS. 11A to 11E illustrate example application screens that can be used to recover printer related settings of the information processing apparatus according to the exemplary embodiment of the present invention.

Therefore, in step S705, the device management control file reading unit 904 parses the element <dm:function> and the display unit 901 displays the character string described in the element 813 on the application "A" launch button 558 illustrated in FIG. 5B. If the application "A" launch button 558 is pressed, the function described in the element 814 is executed and, as a result, an application "A" screen 600 illustrated in FIG. 11A is displayed. The application "A" corresponds to the recovery application 30 illustrated in FIG. 10.

Figure 12:
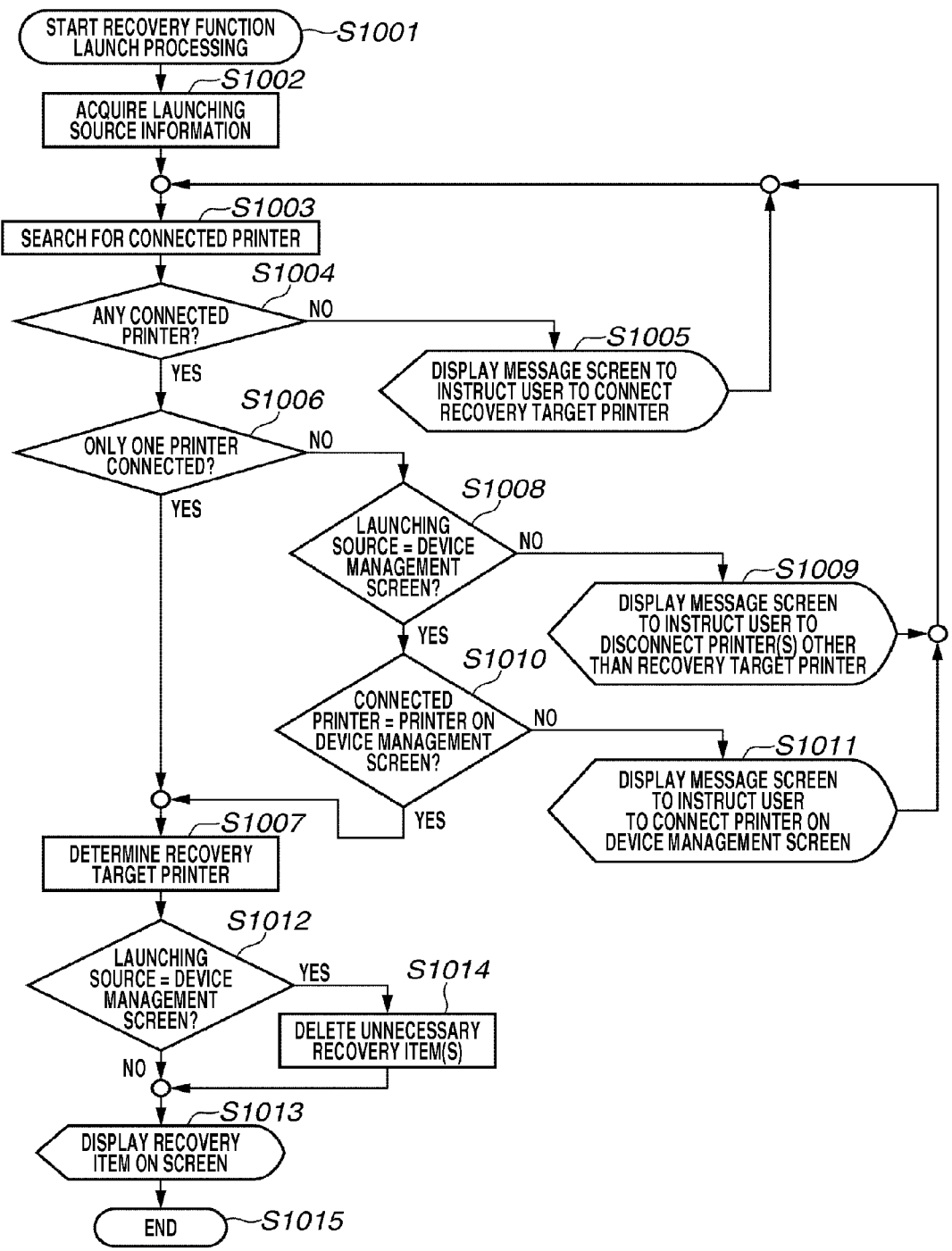
FIG. 12 is a flowchart illustrating an example of processing that can be performed, when the application is launched, according to the exemplary embodiment of the present invention.

FIG. 12 is a flowchart illustrating an example of processing to be performed when the application is launched. A program relating to processing illustrated in the flowchart in FIG. 12 (i.e., the recovery application 30) is stored in the HDD 202 and can be executed by the CPU 204 when the program is loaded into the RAM 201 from the HDD 202.

If a user presses the application "A" launch button 558 on the device management screen 550, in step S1001, the device management control unit 902 provided in the device management 80 illustrated in FIG. 10 executes the content of the element 814 illustrated in FIG. 7 via the link execution unit 903 and starts the application "A" launch processing.

Next, in step S1002, the application control unit 907 transmits the content described in the element 814 to the launching source determination unit 90. According to the example illustrated in FIG. 7, the element 814 includes a description "/devmng" that is identification information indicating launching of the application from the device management screen and a description "/devname" that indicates a device name. When the print application 30 is launched, the link execution unit 903 replaces the description "/devname" with the device name managed by the Devices and Printers folder 500 illustrated in FIG. 5A.

In the present exemplary embodiment, the device 503 is selected when the device management screen 550 is launched. Therefore, in step S1002, the OS acquires a device name (icon name) "ABC Kmmn" having been set as an icon name illustrated in FIG. 5A. Further, the OS transmits the acquired device name (icon name) to the launching source determination unit 906.

Next, in step S1003, the connection device search unit 908 searches for printers that are currently connected. Next, in step S1004, the connection device search unit 908 confirms whether at least one printer is connected. If it is determined that there is not any printer being currently connected (NO in step S1004), it is unfeasible to identify a recovery target printer. Therefore, in step S1005, the connection device search unit 908 displays a message screen illustrated in FIG. 11C to instruct a user to connect a printer to be recovered.

If it is determined that there is at least one printer being currently connected (YES in step S1004), the connection device search unit 908 advances the processing to step S1006. In step S1006, the connection device search unit 908 determines whether a plurality of printers is currently connected. If it is determined that only one printer is currently connected (YES in step S1006), then in step S1007, the connection device search unit 908 determines the recovery target printer.

If it is determined that two or more printers are currently connected (NO in step S1006), then in step S1008, the launching source determination unit 906 determines whether the launching source is the device management screen based on an argument when the launching operation is started.

In the present exemplary embodiment, the element 814 includes a designation "/devmng", based on which the recovery application 30 is launched. Therefore, the launching source determination unit 906 determines that the launching source is the device management screen (YES in step S1008). For example, in a case where the recovery application 30 is not launched from the device management screen, the designation "/devmng" is not included in the argument. In this case, the launching source determination unit 906 determines that the launching source is not the device management screen.

Figure 11B:
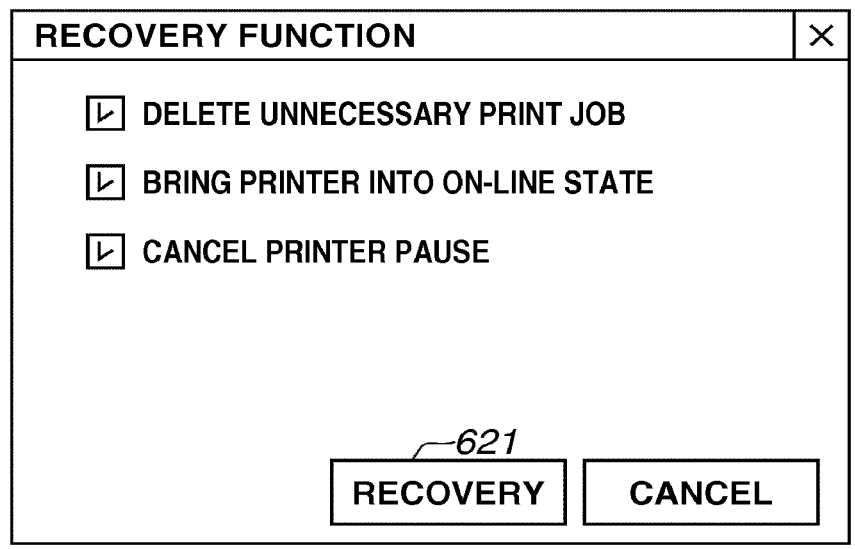
Figure 11C:
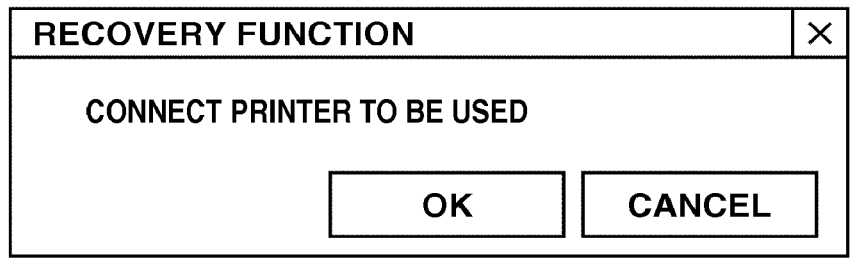
Figure 11D:
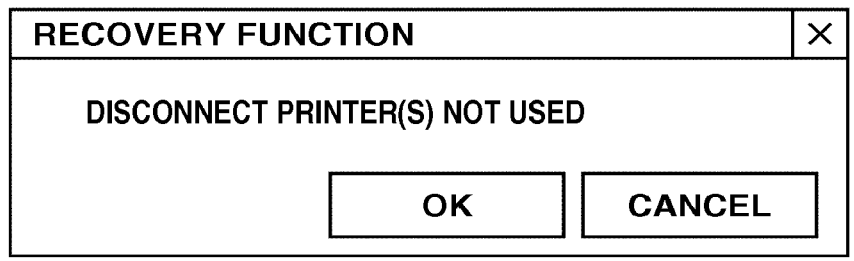

If the launching source determination unit 906 determines that the launching source is not the device management screen (NO in step S1008), then in step S1009, the recovery application 30 displays a message screen illustrated in FIG. 11D to instruct the user to disconnect printer (s) except for the recovery target printer.

If the launching source determination unit 906 determines that the launching source is the device management screen (YES in step S1008), it is regarded that the recovery target printer is already determined. Therefore, the processing of the recovery application 30 proceeds to step S1010. In step S1010, the launching source determination unit 906 confirms whether the device name acquired by the connection device search unit 908 coincides with a device name associated with the device management screen of the launching source.

If it is determined that the compared device names are the same (YES in step S1010), then in step S1007, the recovery application 30 determines the recovery target printer. If it is determined that the compared device names are different (NO in step S1010), then in step S1011, the recovery application 30 displays a message screen illustrated in FIG. 11E to instruct the user to connect a printer having the device name associated with the device management screen.

In the present exemplary embodiment, the device name associated with the device management screen is the device name of each printer. However, the device name can be an identifier (e.g., serial number) of the printer. In this case, the identifier is stored in the device management screen and is required to be transmitted to the recovery application 30 as a parameter when the recovery application 30 is launched.

Next, in step S1012, the launching source determination unit 906 confirms whether the launching source is the device management screen. If it is determined that the launching source is not the device management screen (NO in step S1012), then in step S1013, the recovery application 30 displays a regular recovery screen illustrated in FIG. 11A. The recovery screen illustrated in FIG. 11A includes a plurality of selectable items (i.e., items that the user can select) corresponding to respective functions that can be provided by the recovery application 30. For example, as apparent from FIG. 11A, "delete unnecessary print job" and "bring printer into on-line state" are displayed as the selectable items relating to the functions of the recovery application 30.

On the other hand, if it is determined that the launching source is the device management screen (YES in step S1012), then in step S1014, the recovery application 30 deletes unnecessary recovery items (selectable items) from the regular recovery screen. Then, in step S1013, the recovery application 30 displays a message screen illustrated in FIG. 11B.

In an environment in which various applications are launched using the device management screen, a printer icon used by the user in the application can be identified. Therefore, performing processing for deleting an unnecessary printer icon is useless for the recovery application 30. Further, it is unnecessary to display an item "delete unnecessary icon" (see an icon 602 in FIG. 11A) for the user.

Accordingly, in step S1014, the recovery item determination unit 910 deletes unnecessary recovery items when the launching is performed using the device management screen. For example, the recovery item determination unit 910 regards the recovery item "delete unnecessary icon" (the icon 602 in FIG. 11A) as an unnecessary item. When an application is launched from the device management screen, a printer icon that the user wants to use can be identified. Accordingly, the recovery item determination unit 910 may regard a recovery item "designate as default printer" (see an icon 601 in FIG. 11A) as an unnecessary item to be deleted. The recovery item to be deleted can be preliminarily set in a setting file for each application. In this case, it is useful that the setting file is correctable so that a deletion target item can be arbitrarily changed.

In step S1013, the recovery application 30 displays the screen illustrated in FIG. 11A or FIG. 11B, which displays recovery items. In step S1015, the recovery application 30 terminates the recovery function launch processing.

Figure 11E:
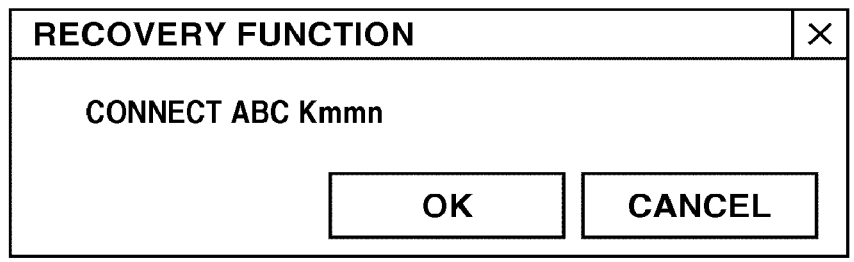

When the recovery application 30 is launched from the device management screen, it is notified that the device management screen is the launching source, so that the recovery application 30 can display a screen including an appropriate notification as illustrated in FIG. 11E. Further, among the recovery items corresponding to regular functions provided by the recovery application 30, it is feasible to delete unnecessary recovery item(s) preliminarily determined, so that functions provided to a user are limited to only the ones appropriate for the user.

Figure 13:
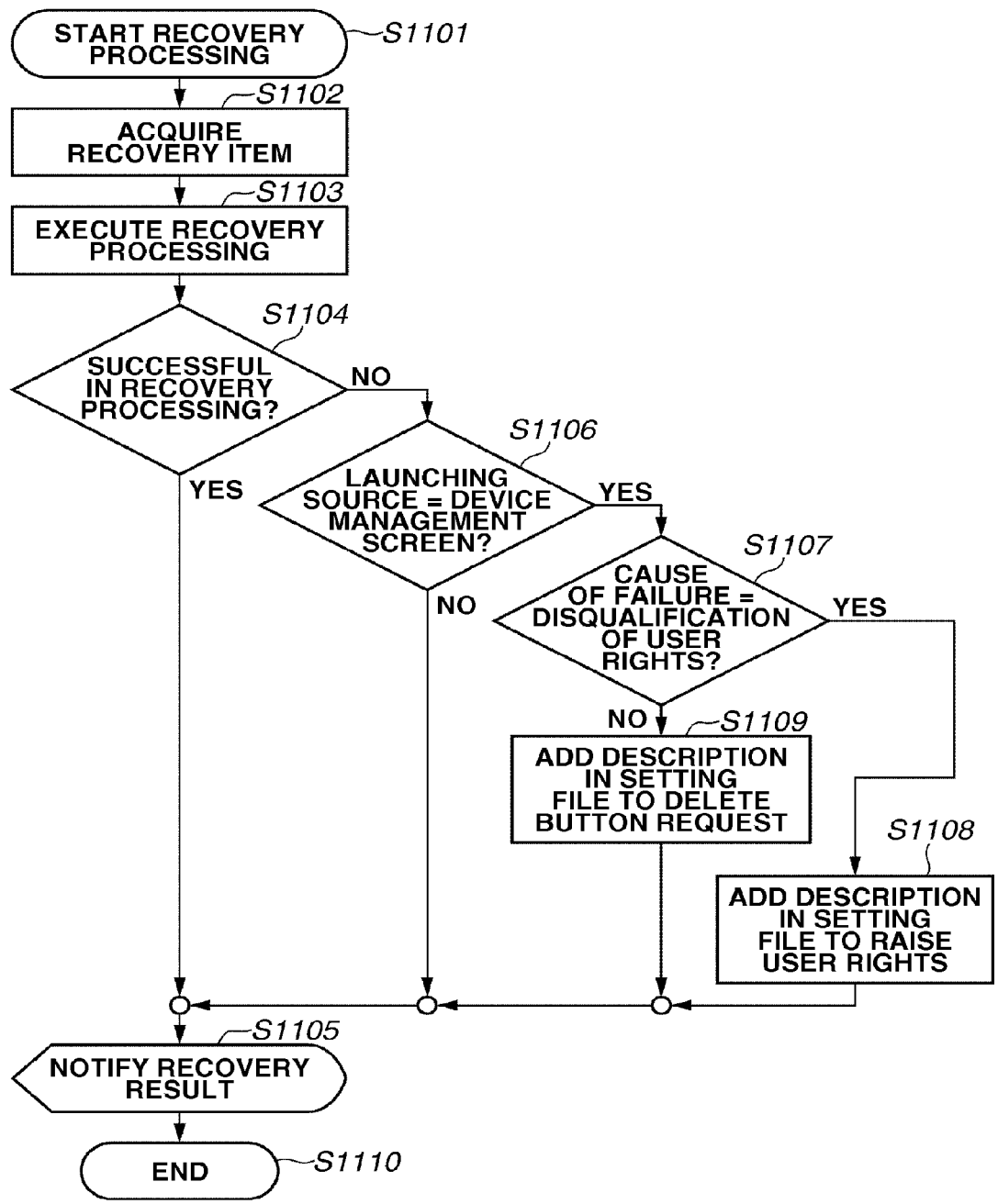
FIG. 13 is a flowchart illustrating an example of processing that can be performed, when the application executes recovery processing, according to the exemplary embodiment of the present invention.

FIG. 13 is a flowchart illustrating an example of processing to be performed when the application executes recovery processing. A program relating to processing illustrated in the flowchart in FIG. 13 is stored in the HDD 202 and can be executed by the CPU 204 when the program is loaded into the RAM 201 from the HDD 202.

If a recovery execution button 620 illustrated in FIG. 11A or a recovery execution button 621 illustrated in FIG. 11B in the recovery application 30 is selected by a user, in step S1101, the application control unit 907 starts the recovery processing. First, in step S1102, the application control unit 907 acquires a recovery item selected on the recovery screen displayed in step S1013 in FIG. 12.

In step S1103, the application control unit 907 executes the recovery processing according to the selected recovery item acquired in step S1102. For example, the application control unit 907 stores recovery processing results (e.g., success or failure in the recovery processing) in the RAM 201. Further, the HDD 202 can store any data relating to processing authority (user right) and executable processing allowed to the authority, while associating them with each other.

For example, the application control unit 907 searches for the data based on log-in user rights, identifies processing that can be executed based on the user rights, and determines whether processing (recovery processing) to be executed by the application control unit 907 is executable.

Then, if it is determined that the recovery processing is unexecutable based on the log-in user rights, the application control unit 907 stores a result of failed recovery processing and the cause of failure (in this case, the recovery processing has failed due to disqualification of user rights) in the RAM 201. Further, for example, the application control unit 907 can refer to a return value obtainable in execution of Application Programming Interface (API) relating to the recovery processing provided by the OS to identify disqualification of user rights as the cause of failure in the recovery processing.

Next, in step S1104, the application control unit 907 confirms whether the recovery processing is successful referring to the recovery processing result stored in the RAM 201. If it is determined that the recovery processing is successfully completed (YES in step S1104), then in step S1105, the recovery application 30 displays a recovery result indicating that the recovery processing is successfully completed. Then, in step S1110, the recovery application 30 terminates the recovery processing. If it is determined that the recovery processing is failed (NO in step S1104), then in step S1106, the launching source determination unit 906 confirms whether the launching source is the device management screen.

If it is determined that the launching source is not the device management screen (NO in step S1106), then in step S1105, the recovery application 30 displays a recovery result indicating that the recovery processing is failed. Subsequently, in step S1110, the recovery application 30 terminates the recovery processing. If it is determined that the launching source is the device management screen (YES in step S1106), then in step S1107, the application control unit 907 confirms whether the cause of failure in the recovery processing is disqualification of operational rights referring to the information stored in the RAM 201.

If it is determined that the cause of failure in the recovery processing is disqualification of operational rights (YES in step S1107), the processing of the application control unit 907 proceeds to step S1108. In step S1108, the application control unit 907 raises the user rights and records information instructing launching of the recovery application 30 from the device management screen in an application control information storing unit 920 of the information processing apparatus.

In the present exemplary embodiment, the application control information storing unit 920 is the HDD 202 provided in the information processing apparatus and can be presumed as a registry of Windows OS. Subsequently, in step S1105, the recovery application 30 displays a recovery result that includes recommendation with respect to re-execution of the recovery function from the device management screen. Further, in step S1110, the recovery application 30 terminates the recovery processing.

As described above, the launching source determination unit 906 identifies the launching source in step 1106, so that the application "A" can perform processing specialized for the device management screen only when the launching source is the device management screen.

On the other hand, if it is determined that the cause of failure in the recovery processing is not the disqualification of operational rights (NO in step S1107), the application control unit 907 determines that the recovery application 30 launched from the device management screen is inoperable in the user's environment. Therefore, in step S1109, the application control unit 907 records information instructing deletion of the application "A" launch button in the application control information storing unit 920 of the information processing apparatus. Subsequently, in step S1105, the recovery application 30 displays the recovery result indicating that the recovery processing is failed. Further, in step S1110, the recovery application 30 terminates the recovery processing.

A device management control file 1200 illustrated in FIG. 14 corresponds to a part of the device management control file 800 illustrated in FIG. 7. The device management control file 1200 includes a description of information relating to the device management screen 550 or a device management screen 1500. The device management 80 refers to the information recorded in the application control information storing unit 920 in step 1108 to select the device management screen 550 or the device management screen 1500 as a screen to be displayed. A procedure for display determination is described below.

The device management control file 1200 includes an element <dm:request> 1201 which describes a condition for displaying the application "A" launch button 558 on the device management screen 550. An "exist" attribute indicates that there is information recorded in the application control information storing unit 920. The element 1201 includes a description of "FALSE" as an attribute value. In short, the description <dm:request exist="FALSE"> in the element 1201 indicates a condition that there is not any information recorded in the application control information storing unit 920.

If there is not any information recorded in the application control information storing unit 920, the Launch Application "A" button is displayed on the device management screen 550. Processing to be executed in response to selection of the "Launch Application A" button is described above with reference to FIG. 12 and FIG. 13.

On the other hand, if there is information recorded in the application control information storing unit 920 in step 1108, the condition indicated by the element 1201 is not satisfied. The device management control file 1200 includes the next <dm:function> describing another condition as an element <dm:request> 1202. The element <dm:request> 1202 includes a description "TRUE" as an attribute value of the "exist" attribute. The description "TRUE" indicates that information recorded in the application control information storing unit 920 is essential. Further, the element <dm:request> 1202 includes a description "admin" as an attribute value of an "elevation" attribute. The description "admin" indicates a condition that the information recorded in the application control information storing unit 920 in step 1108 can be launched based on administrator rights. In other words, the condition <dm:request exist="TRUE" elevation="admin"> described in the element 1202 can be satisfied when the information recorded in the application control information storing unit 920 in step 1108 includes an instruction to launch based on the administrator rights. If the condition described in the element 1202 is satisfied, the device management screen 1500 illustrated in FIG. 15 can be displayed.

A character string "Launch Application A (Administrator rights is necessary)" is set to the application "A" launch button 1501 on the device management screen 1500. Therefore, a user can clearly recognize that the function corresponding to the button 1501 requires the administrator rights to launch. Further, an icon 1502 simply indicating the application "A" is displayed. The icon 1502 can be replaced by another icon indicating that the function requires the administrator rights to launch.

Therefore, in a case where the application "A" does not require the administrator rights, the application "A" can be launched based on ordinary rights. On the other hand, in a case where the application "A" requires the administrator rights, the application "A" can be launched based on administrator rights. Thus, the application launch processing using the device management screen can be optimized.

If the application "A" launch button 1501 is pressed by a user, the device management 80 launches the recovery application 30 according to a code "%ProgramFiles%ABCYApplicationA.exe/devmng/debname/admin" described in an element 1203. In this case, the element 1203 includes an instruction "/admin." Therefore, the link execution unit 903 launches the recovery application 30 based on the administrator rights.

Further, if in step S1107 it is determined that the cause of failure in the recovery processing is not the disqualification of operational rights, the application control unit 907 can determine that the recovery processing is infeasible in the user's environment and can delete the application "A" launch button from the device management screen 1500. If the cause of failure in the recovery processing is not the disqualification of operational rights (NO in step S1107), then in step S1109, the recovery application 30 records a setting indicating non-display of the application in the application control information storing unit 920. In this case, if information is already present in the application control information storing unit 920, the recovery application 30 deletes the information from the application control information storing unit 920.

In the device management screen launch processing, the information recorded in the application control information storing unit 920 is essential because an element <dm:request> 1204 includes a description "TRUE" as an attribute value of the "exist" attribute. Further, the element 1204 includes a description "TRUE" as an attribute value of a "taskdisable" attribute.

The description in the element 1204 indicates that the information recorded in the application control information storing unit 920 instructs non-display of the application "A" launch button. In short, the condition <dm:request exist="TRUE" taskdisable="TRUE"> described in the element 1204 can be satisfied when the information recorded in the application control information storing unit 920 includes an instruction to delete the application "A" launch button. If the condition described in the element 1204 is satisfied, a device management screen 1510 illustrated in FIG. 15 can be displayed. As indicated by a blank space 1511, the device management screen 1510 does not include the application "A" launch button.

Further, if the information recorded in the application control information storing unit 920 in step 1108 is recorded in a memory area dedicated to each user as information relating to a current log-in user of the PC 1, the display content of the device management screen can be switched for each user. The memory area dedicated to each user is, for example, an area "HKEY_CURRENT_USER" of a registry. For example, the above described configuration enables the device management 80 to display the device management screen 550 for a user who is not required to have the administrator rights and display the device management screen 1500 for a user who is required to have the administrator rights.

The application described in the first exemplary embodiment is the recovery application capable of changing printer settings to appropriate ones. An application described in a second exemplary embodiment is a print application to be launched from the device management to create and output various print products. The print application has the capability of printing any one of different types of print products, such as a photoprint, an album, a DVD/CD label, and a calendar, as described below, according to a user's operation.

A system configuration of a peripheral apparatus control system according to the present exemplary embodiment is similar to the system configuration according to the first exemplary embodiment illustrated in FIG. 1. Further, although not illustrated in the drawings, hardware configurations of a PC and a printer are similar to the configurations illustrated in FIGS. 2A and 2B. A software configuration of the PC is similar to the configuration illustrated in FIG. 3. A configuration of a printer driver in the PC is similar to the configuration illustrated in FIG. 4. Thus descriptions of these configurations are omitted. Further, in the present exemplary embodiment, the application "A" 30 is a print application 1700.

In the present exemplary embodiment, the Devices and Printers folder 500 illustrated in FIG. 5A can be displayed on the LCD 206 of the information processing apparatus. The Devices and Printers folder 500 indicates driver icons of printers and facsimile machines that are in usable states by the information processing apparatus. If a user clicks on the symbol mark indicating the device 503 named as "ABC Kmmn" with the mouse, the device management screen 550 illustrated in FIG. 5B can be displayed.

Device connection processing, device management control file installation processing, and device management screen launch processing according to the present exemplary embodiment are similar to those described with reference to the flowcharts illustrated in FIG. 6, FIG. 8, and FIG. 9 and therefore their descriptions are not repeated.

A device management control file 1600 illustrated in FIG. 16 is a device management control file used in the present exemplary embodiment. FIG. 16 illustrates a part of the device management control file according to the present exemplary embodiment. The device management control file 1600 includes an element <dm:request> 1601 and an element <dm:request> 1604 which are similar to those described in the device management control file 1200 illustrated in FIG. 14 according to the first exemplary embodiment.

The element 1601 includes a description "TRUE" as an attribute value of a "photoprint" attribute. The element <dm:request> 1604 includes a description "TRUE" as an attribute value of an "album" attribute. These descriptions indicate a condition that the presence of "photoprint" and "album" as application control information is recorded in print application termination processing, and according to presence of absence the application control information, the display content can be switched.

None of the application control information to be recorded in the print application termination processing is present in an initial state. Therefore, buttons corresponding to an element <dm:name> 1602 and an element <dm:name> 1605 are not displayed. On the other hand, an element <dm:name> 1607 does not include any preceding element <dm:request>. Therefore, the corresponding application "A" launch button 558 is constantly displayed. As a result, the device management screen is displayed to have a format similar to the above described device management screen 550 illustrated in FIG. 5B. In the present exemplary embodiment, the application "A" is the print application 1700.

An element <dm:execute> 1603, an element <dm:execute> 1606, and an element <dm:execute> 1608 include a code to be executed when a button corresponding to the element <dm:name> 1602, the element <dm:name> 1605, and the element <dm:name> 1607 is pressed, respectively. Among the <dm:execute> codes described in the elements 1603, 1606, and 1608, a description "%ProgramFiles%YABCYApplicationA.exe" designates a location of an execution module of the print application 1700.

Further, a description "/devmng" is a first command line option that indicates launching of the application from the device management screen. A description "/photo" included in the element 1603 and a description "/album" included in the element 1606 are a second command line option which is an example of function identification information designating a function to be executed in the print application 1700.

The element 1608 does not include the second command line option designating the function to be executed. A description "/devname" represents a device name which can be replaced by an actual device name when the print application 1700 is launching as described in the first exemplary embodiment.

FIG. 17 illustrates an example of the functional configuration including a device management and the print application. The device management 80 illustrated in FIG. 17 is similar to the device management 80 described in the first exemplary embodiment with reference to FIG. 10. The print application 1700 includes a launching source determination unit 1706, an application control unit 1707, a UI control unit 1708, an editing processing unit 1709, and a print processing unit 1710. The application control unit 1707 can write application control information into the application control information storing unit 920 in the application termination processing.

Hereinafter, print application launch processing is described below with reference to a flowchart illustrated in FIG. 18. A program relating to processing illustrated in the flowchart in FIG. 18 (i.e., the print application 1700) is stored in the HDD 202 and can be executed by the CPU 204 when the program is loaded into the RAM 201 from the HDD 202.

If a user presses the application "A" launch button 558 on the device management screen 550, the device management control unit 902 of the device management 80 illustrated in FIG. 17 executes the content of the element 1608 illustrated in FIG. 16 via the link execution unit 903. Accordingly, in step S1801, the application control unit 1707 starts application "A" launch processing.

Next, in step S1802, the application control unit 1707 acquires the content described in the element 1608 as information indicating a launching source and a launching function of the print application 1700, and stores the acquired information in a predetermined area of the RAM 201 managed by the print application 1700. Then, in step S1803, the application control unit 1707 determines whether the acquired content includes the second command line option that designates a function to be executed. The element 1608 does not include the second command line option. Therefore, the processing of the application control unit 1707 proceeds to step S1804.

In step S1804, the application control unit 1707 transmits the content of the element 1608 to the launching source determination unit 1706. The launching source determination unit 1706 determines whether the content of the element 1608 includes the first command line option that indicates launching of the application from the device management screen. The element 1608 includes the first command line option. Therefore, the launching source determination unit 1706 determines that the application is launched from the device management screen. The processing proceeds to step S1805.

In step S1805, the application control unit 1707 acquires application control information to be recorded in the application termination processing from the application control information storing unit 920 and reduces the number of items to be displayed on the menu screen based on the acquired information. However, as described above, the application control information to be recorded in the application termination processing is not present in the initial state. Therefore, there is not any item to be deleted. Subsequently, in step S1806, the application control unit 1707 displays a menu screen 1900 illustrated in FIG. 19 on the LCD 206 of the PC 1 via the UI control unit 1708.

Figure 19:
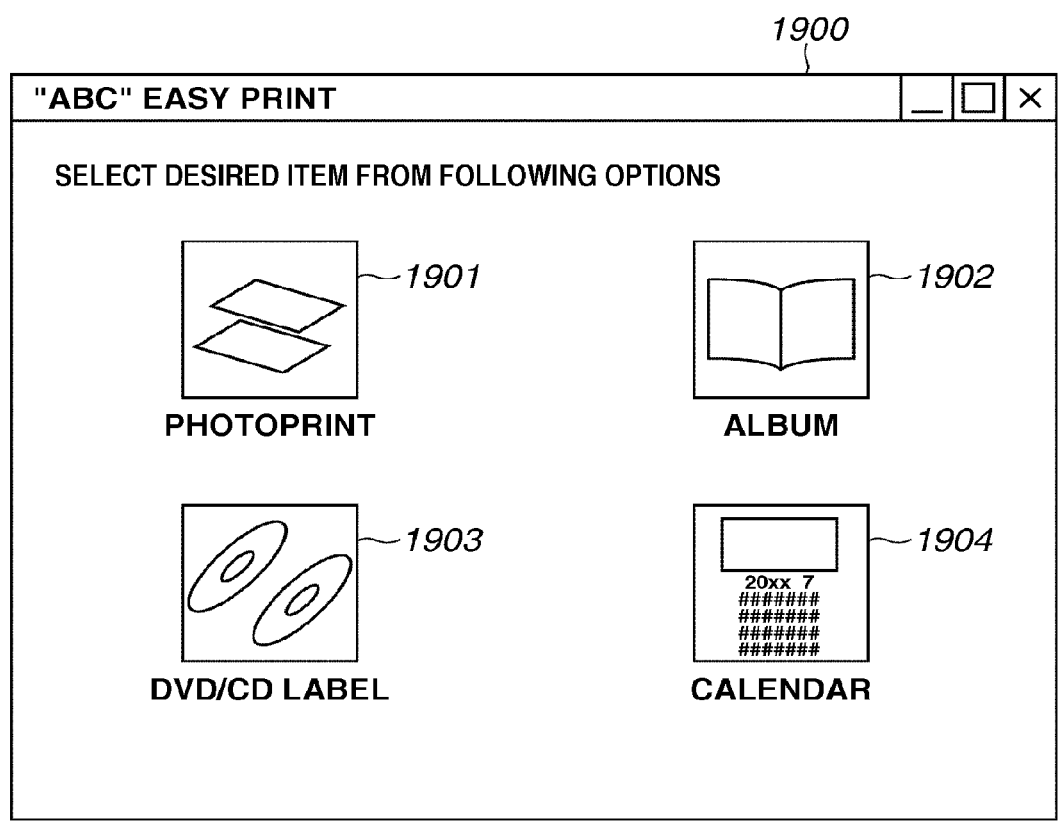
FIG. 19 illustrates a user interface (UI) display example of a menu screen which the print application can display on a liquid crystal display (LCD).

FIG. 19 illustrates an example of a UI display of the menu screen 1900 which the print application can display on the LCD. The menu screen 1900 includes a "photoprint" button 1901, an "album" button 1902, a "DVD/CD label" button 1903, and a "calendar" button 1904. If any one of the displayed buttons is pressed by the user, then in step S1807, the UI control unit 1708 notifies the application control unit 1707 of a selected item.

Subsequently, in step S1808, the application control unit 1707 determines a print function to be launched which can be selected from "photoprint", "album", "DVD/CD label", and "calendar", based on the user's input acquired in step S1807. Then, in step S1809, the application control unit 1707 terminates the print application launch processing illustrated in FIG. 18. Subsequently, the application control unit 1707 integrally controls the UI control unit 1708, the editing processing unit 1709, and the print processing unit 1710 to execute the function determined in step S1808.

If it is determined that the acquired content includes the launching function designation information (YES in step S1803), then in step S1810, the application control unit 1707 acquires the second command line option.

Then, in step S1808, the application control unit 1707 determines the print function to be launched, which can be selected from "photoprint", "album", "DVD/CD label", and "calendar", based on the acquired second command line option. For example, if a parameter in the second command line is "/photo" included in the element 1603 illustrated in FIG. 16, the application control unit 1707 determines to launch the "photoprint" print function. If the parameter in the second command line is "/album" included in the element 1606, the application control unit 1707 determines to launch the "album" print function. In this case, the application control unit 1707 can skip the processing in step S1806. Therefore, the application control unit 1707 can directly execute the designated function without displaying the menu screen 1900.

Further, if in step S1804 it is determined that the application is not launched from the device management screen, it can be regarded that execution of the print application 1700 is not related to the device management 80. In this case, the application control unit 1707 skips the menu display item reduction processing (see step S1805), and advances the processing to step S1806 in which the application control unit 1707 displays the menu screen 1900. Accordingly, in a case where the print application 1700 is not launched from the device management screen, the menu screen 1900 including all display items can be constantly displayed.

Figure 20:
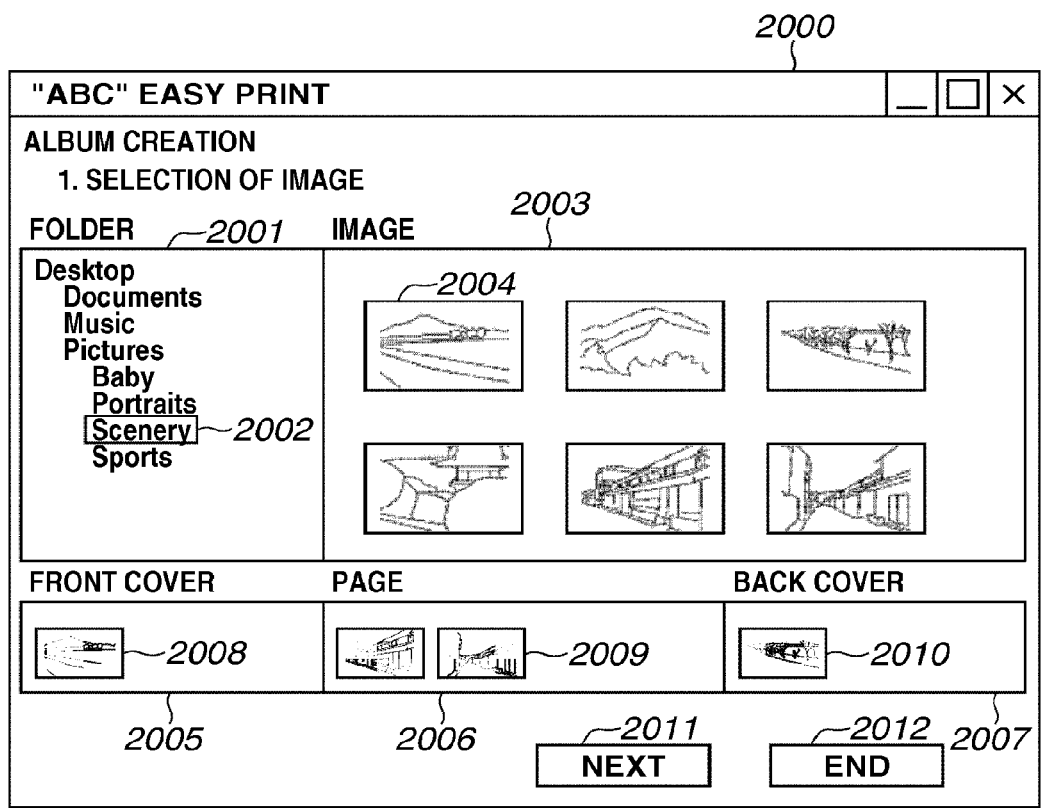
FIG. 20 illustrates an example UI display screen captioned as "selection of image" which is a first stage of an "album" creation function provided by the print application.
Figure 21:
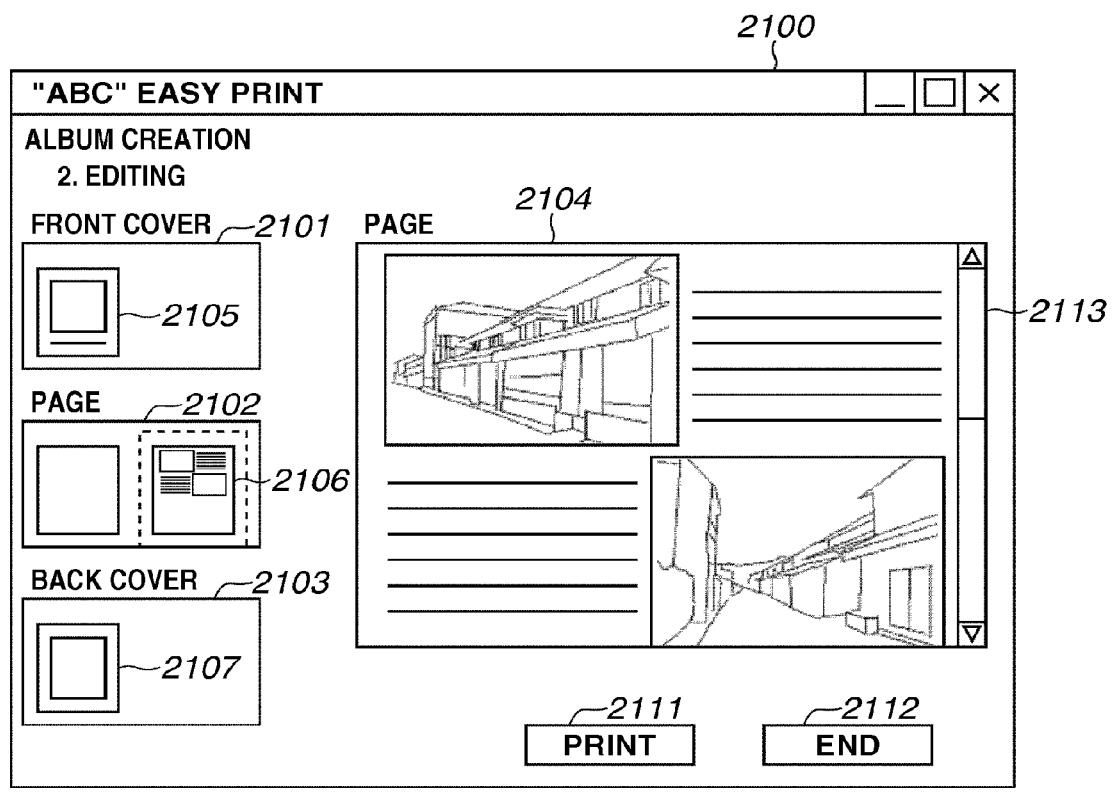
FIG. 21 illustrates an example UI display screen captioned as "editing" which is a second stage of the "album" creation function.

Next, an example print product creation operation that can be performed by the print application 1700 is described below with reference to FIG. 20 and FIG. 21. FIG. 20 illustrates an example UI display screen captioned as "selection of image" which is a first stage of an "album" creation function provided by the print application 1700. FIG. 21 illustrates an example UI display screen captioned as "editing" which is a second stage of the "album" creation function. The album creation function provided by the print application 1700 enables a user to create an album including at least one text body page inserted between a front cover and a back cover, all pages of which are printed on pieces of paper having the same size.

Figure 18:
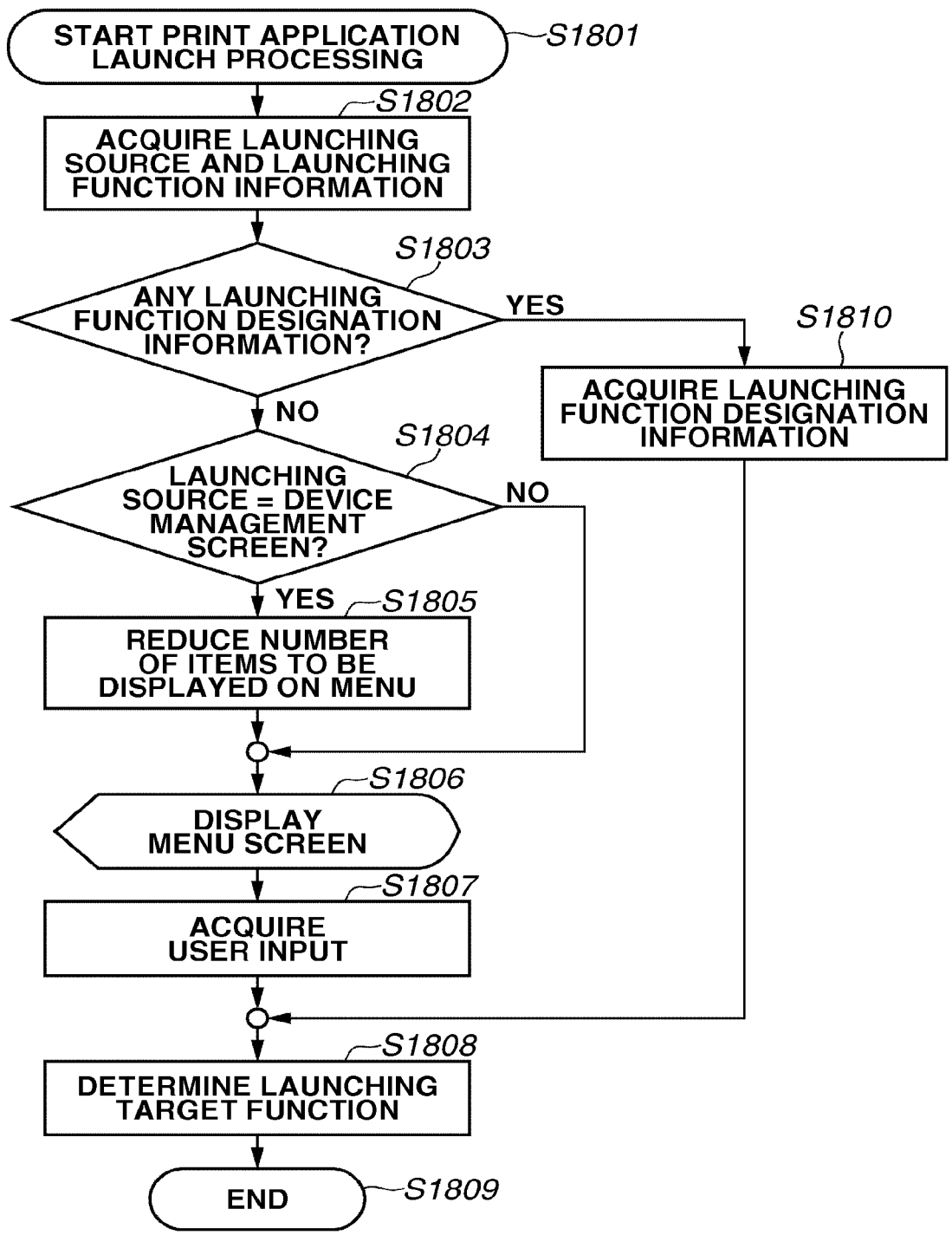
FIG. 18 is a flowchart illustrating an example of print application launch processing according to the exemplary embodiment of the present invention.

If in step S1807 in the flowchart illustrated in FIG. 18 the "album" button 1902 is selected on the menu screen 1900 illustrated in FIG. 19, a "selection of image" screen 2000 of the "album" creation function illustrated in FIG. 20 can be displayed on the LCD 206 of the information processing apparatus. Similar processing is performed when "/album" is acquired as the second command line option in step S1810. To this end, the application control unit 1707, the UI control unit 1708, and the editing processing unit 1709 cooperatively perform the processing.

The "selection of image" screen 2000 includes a folder display/selection field 2001 in which a folder configuration of the HDD 202 of the information processing apparatus can be displayed. Further, the "selection of image" screen 2000 includes an image display/selection field 2003. If a specific folder (e.g., a "Scenery" folder 2002) is selected by a user operation, reduced images (an image 2004 etc.) of image files recorded in the selected folder can be displayed in the image display/selection field 2003.

The "selection of image" screen 2000 further includes a front cover image area 2005, a page image area 2006, and a back cover image area 2007 which are located at the lower part of the screen. If the user selects any one of the reduced images displayed in the image display/selection field 2003 with the mouse and performs a drag-and-drop operation to move the selected image into the front cover image area 2005, a copy 2008 of the reduced image can be displayed in the front cover image area 2005. Then, an image file corresponding to the reduced image can be designated as a target image to be located in the front cover of an album to be created.

The page image area 2006 and the back cover image area 2007 are similar to the front cover image area 2005 and can be used when an image 2009 is designated as an image to be located on the text body page and when an image 2010 is designated as an image to be located on the back cover of the album.

If a "next" button 2011 is pressed, the print application 1700 completes selection of target images to be located on respective pages. Then, the processing of the print application 1700 proceeds to an editing stage of adjusting the layout of the images. If an "end" button 2012 is pressed, the print application 1700 terminates the processing. In this case, the print application termination processing is executed as described below.

When the processing proceeds to the editing stage, the editing processing unit 1709 locates the images selected in the "selection of image" screen 2000 on respective paper surface areas of the front cover, the text body page, and the back cover. Further, the application control unit 1707, the UI control unit 1708, and the editing processing unit 1709 cooperatively display an "editing" screen 2100 of the "album" creation function illustrated in FIG. 21 on the LCD 206 of the information processing apparatus.

The "editing" screen 2100 includes a front cover display field 2101 in which a reduced image 2105 of the front cover page can be displayed. The "editing" screen 2100 further includes a page display field 2102 and a back cover display field 2103 which are similar to the front cover display field 2101. As illustrated in FIG. 21, an enlarged image of a page 2106 selected in the page display field 2102 can be displayed in a page editing field 2104. The page editing field 2104 is different from the paper surface in aspect ratio. The paper surface is longer in the vertical direction than the page editing field 2104. Therefore, a user can manipulate a scroll bar 2113 to designate a part of the paper surface to be displayed in the page editing field 2104.

The user can edit the page layout by moving, adding, and deleting an intended object on the page image displayed in the page editing field 2104. In this case, images, texts, and graphics are main objects that can be edited. However, the objects to be edited are not limited to these items. Further, the editing processing performed on these objects is not different from processing performed by a general image editing application, although not described below.

If a "print" button 2111 is pressed, the application control unit 1707 transmits created album data to the print processing unit 1710. The print processing unit 1710 prints an album having a predetermined size which corresponds to the reduced images displayed in the front cover display field 2101, the page display field 2102, and the back cover display field 2103.

A device designated by the link execution unit 903 of the device management 80 which replaces the command line parameter "/devname" when the print application 1700 is launched, can be used as a print designation printer. If the above described designation is not present, a system standard printer to which the default mark 502 (see FIG. 5A) is attached can be used. The application control unit 1707 can display a dialog box or a similar UI that enables a user to select a desired printer as a print designation.

If an "end" button 2112 is pressed, the print application 1700 terminates the processing. In this case, the print application termination processing is executed as described below.

Other functions, i.e., "photoprint", "DVD/CD label", and "calendar" creation functions, are essentially similar to the above described "album" creation function, although they may be different in layout, editable object type, editing target paper surface area size, shape, and number of pages. Thus, descriptions of these functions are omitted.

Figure 22:
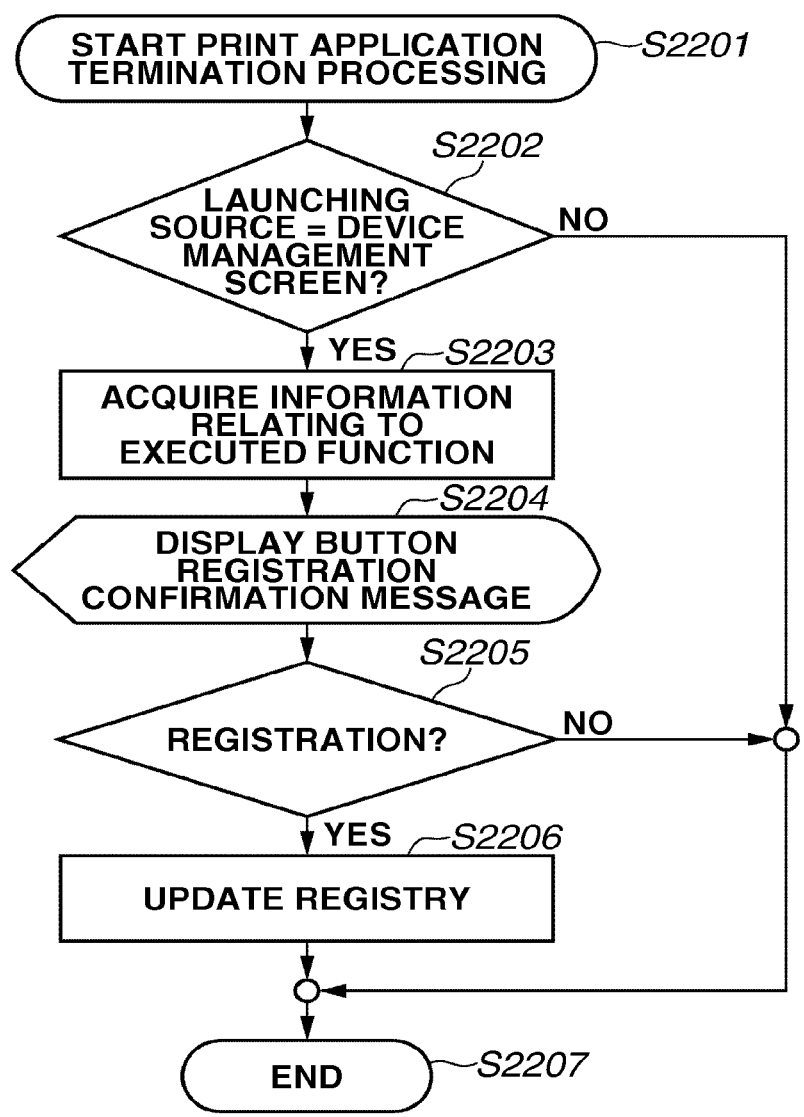
FIG. 22 is a flowchart illustrating an example of print application termination processing according to the exemplary embodiment of the present invention.
Figure 23:
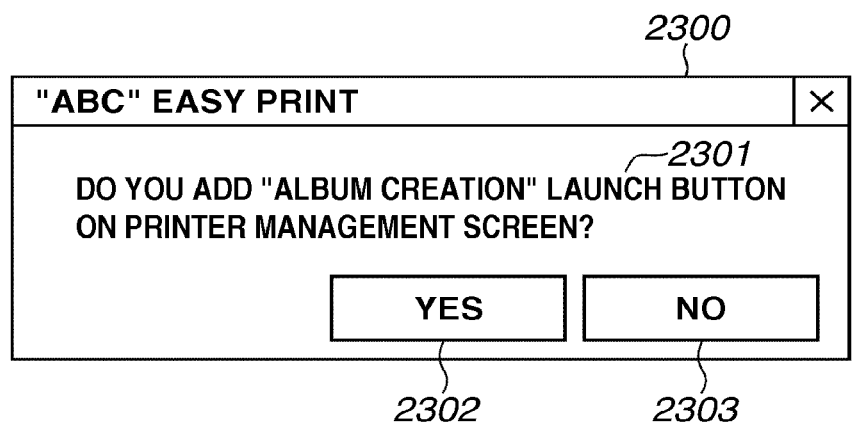
FIG. 23 illustrates an example of a message screen that the print application can display on the LCD of the information processing apparatus during processing.

Next, an example of processing for terminating the print application 1700 is described below with reference to a flowchart illustrated in FIG. 22 and a drawing illustrated in FIG. 23. FIG. 22 is a flowchart illustrating an example of print application termination processing. FIG. 23 illustrates an example of a message screen that the print application can display on the LCD of the information processing apparatus during processing.

If the "end" buttons 2012 and 2112 are pressed in respective stages of the "album" creation function provided by the print application 1700, then in step 52201, the application control unit 1707 starts the print application termination processing. If similar buttons are pressed on screens dedicated to other functions, i.e., "photoprint", "DVD/CD label", and "calendar" creation functions, the application control unit 1707 similarly starts the print application termination processing.

First, in step S2202, the application control unit 1707 transmits information indicating the launching source of the print application 1700 which was stored in the RAM 201 in the application launching processing (see step S1802) to the launching source determination unit 1706. The launching source determination unit 1706 determines whether the launching source is the device management screen referring to the acquired information. If it is determined that the launching source is the device management screen (YES in step S2202), the processing proceeds to step S2203.

Next, in step S2203, the application control unit 1707 acquires information indicating the creation function having been executed by the print application 1700, which is the "photoprint", "album", "DVD/CD label", or "calendar" creation function.

Next, in step S2204, the application control unit 1707 displays a button registration confirmation message 2300 illustrated in FIG. 23 on the LCD 206 of the information processing apparatus via the UI control unit 1708.

A message text 2301 includes a function name based on the function information acquired in step S2203 and inquires a user whether to display a button for enabling a user to directly launch a function corresponding to the function name without opening the menu screen 1900 on the device management screen 550 of the device management 80. Although FIG. 23 illustrates a message example to be displayed when the "album" creation is performed, a similar display containing a function name can be performed using the message text 2301 when other function is performed.

Subsequently, in step S2205, the application control unit 1707 acquires a user's input via the UI control unit 1708 to determine the next processing to be performed. If the user presses a "YES" button 2302 (YES in step S2205), the processing of the application control unit 1707 proceeds to step S2206.

Then, the application control unit 1707 writes, into the application control information storing unit 920, information necessary to additionally display the launch button of the function corresponding to the function information acquired in step S2203 on the device management screen 550 of the device management 80. Further, at the same time, if any information for displaying another function launch button is present, the application control unit 1707 deletes the information.

For example, if the function information acquired in step S2203 is the "album" creation, the application control unit 1707 records information indicating "album" in the application control information storing unit 920 (i.e., the registry). Then, if information "photoprint" required to display a "photoprint" launch button or information relating to DVD/CD label creation or calendar creation is present in the registry, the application control unit 1707 deletes the remaining information. The information "album" and "photoprint" correspond to the elements 1604 and 1601 of the device management control file 1600 illustrated in FIG. 16, respectively.

Then, in step S2207, the application control unit 1707 terminates the print application processing.

On the other hand, if the user presses a "NO" button 2303 on the button registration confirmation message 2300 illustrated in FIG. 23, the application control unit 1707 immediately terminates the print application processing without executing the processing in step S2206 (i.e., without updating the registry).

If in step S2202 the launching source determination unit 1706 determines that the launching source is not the device management 80, the application control unit 1707 skips the sequential processing in step S2203 to step S2206 and immediately terminates the print application processing.

Figure 24:
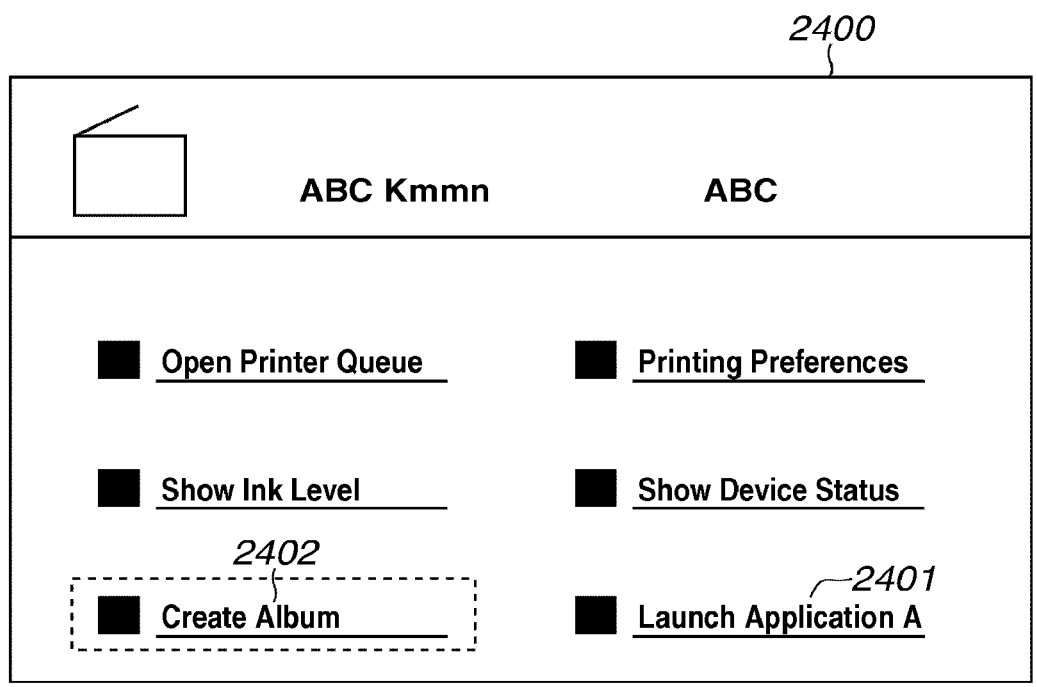
FIG. 24 illustrates an example UI display screen of the device management.
Figure 25:
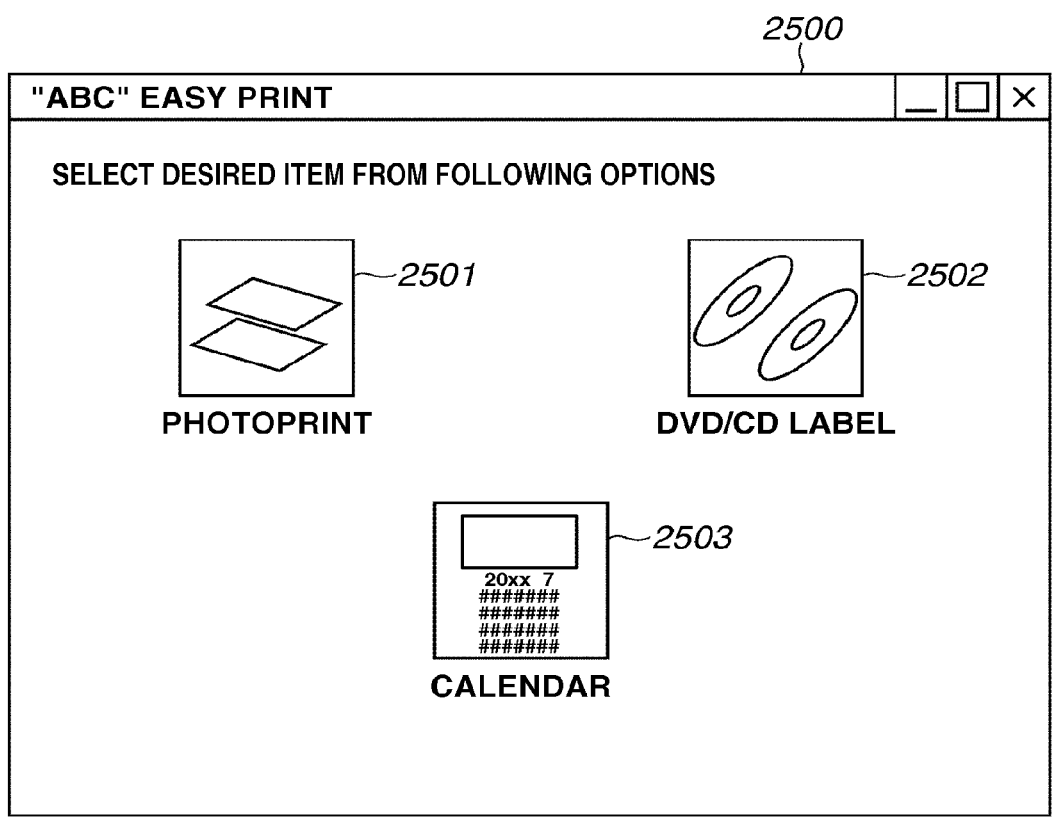
FIG. 25 illustrates an example UI display screen of the print application.

Subsequently, an example of an operation that can be performed when the screen of the device management 80 is opened again after the print application 1700 is launched from the device management 80 is described below with reference to FIG. 16, FIG. 24, and FIG. 25. FIG. 24 illustrates an example UI display screen of the device management. FIG. 25 illustrates an example UI display screen of the print application.

In the present exemplary embodiment, it is assumed that the "YES" button 2302 is pressed by a user on the message screen illustrated in FIG. 23 to terminate the print application 1700 after the "album" creation is completed. In this case, in step S2206, information indicating "album" is recorded in the application control information storing unit 920.

If the device management 80 resumes from this condition, the device management control file reading unit 904 of the device management 80 reads the device management control file 1600 from the device management control file storage unit 905. Further, the device management control unit 902 acquires the information recorded in the application control information storing unit 920. When the display unit 901 is controlled based on the acquired information, a device management screen 2400 illustrated in FIG. 24 can be displayed.

The element <dm:request> 1604 included in the device management control file 1600 indicates that a button display condition is satisfied when the information indicting "album" is present in the application control information storing unit 920. In a case where the device management 80 is opened in the above described state, the condition described in the element 1604 can be satisfied. Therefore, a button 2402 accompanied by a character string "Create Album" described in the element 1605 is displayed.

On the other hand, information indicating "photoprint" described in the element <dm:request> 1601 as a display condition is not present. Therefore, a button accompanied by a character string "Print Photos" described in the element 1602 does not appear. Further, a button 2401 accompanied by a character string "Launch Application A" described in the element 1607 does not have any preceding <dm:request> element. Therefore, the button 2401 can be constantly displayed, as described above.

If the newly added button 2402 is pressed, the link execution unit 903 launches the print application 1700 according to the element 1606 corresponding to the button 2402 in the device management control file 1600. Thus, the print application launch processing illustrated in FIG. 18 is executed. In this case, in step S1803 it is determined that the acquired content includes the launching function designation information.

In step S1810, the "album" creation is acquired as the launching function designation information based on the second command line option "/album" included in a command line character string of the element 1606. Then, the application control unit 1707 terminates the print application launch processing without executing the processing in step S1806 to display the menu screen 1900. The processing directly proceeds to the first stage of the "album" creation (see screen 2000).

On the other hand, if the button 2401 is pressed on the device management screen 2400 of the device management 80, the link execution unit 903 launches the print application 1700 according to the element 1608 corresponding to the button 2401 in the device management control file 1600. Thus, the print application launch processing illustrated in FIG. 18 is executed. In this case, in step S1803 it is determined that the acquired content does not include the launching function designation information. And, in step S1804 it is determined that the launching source is the device management screen. Thus, the processing proceeds to step S1805.

Then, the number of menu items to be displayed is reduced based on the information stored in the application control information storing unit 920. More specifically, the information indicating "album" is present in the application control information storing unit 920. Therefore, the "album" button corresponding to the information indicating "album" is deleted from the menu screen. As a result, in step S1806, a menu screen 2500 illustrated in FIG. 25 is displayed. The menu screen 2500 does not include the "album" button 1902, which is present on the menu screen illustrated in FIG. 19.

Processing operations to be performed in response to selection of respective buttons 2501, 2502, and 2503 on the menu screen 2500 are similar to the processing operations performed in response to selection of the buttons 1901, 1903, and 1904 on the menu screen 1900 illustrated in FIG. 19.

As described above, the button 2402 enabling a user to directly launch the function having been actually executed in the print application 1700 is additionally displayed on the device management screen 2400 of the device management 80. Therefore, the present exemplary embodiment can reduce the number of operations required to launch the function that may be reused by the user. Further, the present exemplary embodiment dynamically updates a button to be displayed to enable a user to directly launch a function when the print application 1700 is operated. Therefore, processing for calling a different function is feasible when the device management screen is opened next. In other words, the operability of the software group illustrated in FIG. 17 can be improved for the user.

When an application is launched from the device management 80, the function additionally displayed on the device management screen 2400 of the device management 80 is deleted from the menu screen 2500 of the print application 1700. Thus, the present exemplary embodiment can delete unnecessary options to be displayed from an application UI, without reducing the number of functions that can be executed by the print application 1700. The deletion of display items on the menu screen 2500 is performed only when it is determined that the launching source is the device management 80 (YES in step S1804 of FIG. 18). Accordingly, the present exemplary embodiment can prevent UI processing of the print application 1700 from being uselessly executed in an environment in which the device management 80 is present. Further, the present exemplary embodiment can improve the operability for a user. In this case, no adverse effect is given to functions of the print application 1700 in an environment in which the device management 80 is not present or in a case where a launching method not using the device management 80 is employed.

According to the above described embodiment, in the initial state, the application control information storing unit 920 does not store any information relating to the display of each function button, such as "photoprint" or "album." However, it may be useful to display a predetermined function button in the initial state if the function button is frequently used.

Further, the button registration confirmation message 2300 is displayed to inquire a user about registration of an additional button when the application control information is updated in the print application termination processing. However, to reduce the number of user operations, it may be useful to cancel the inquiry and constantly update the application control information.

Further, in the above described exemplary embodiment, the device management 80 displays the button corresponding to the latest function having been executed by the print application 1700 when the application control information is updated. Alternatively, it may be useful to count the frequency of use of each function after the print application 1700 is installed on the information processing apparatus and display a particular button on a screen of the device management 80, based on a comparison between recorded data, to indicate a function that has been most frequently used in a specific period. Further, the device management 80 may be controlled to simultaneously add and display a plurality of function buttons.

According to the above described exemplary embodiments, launching of an application from the "Device Stage" is recognized by the application, so that useless processing of the application can be prevented. Further, according to the above described exemplary embodiments, if it is determined that the application is required to provide different processing, the display of the "Device Stage" can be changed to an appropriate one. Subsequently, when the application is launched next time, processing for calling a different function from the "Device Stage" can be performed. Thus, the operability can be improved for apparatus users.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium). In an example, a computer-readable medium may have a program stored thereon that causes a computer associated with a display device to operate as an information processing apparatus as described herein. In another example, a computer-readable medium may have a program stored thereon that causes an information processing apparatus to perform a method as described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
a display unit configured to display a device management screen corresponding to a specific peripheral apparatus; and
a control unit configured to, in a case where an instruction for launching an application is input via the device management screen, launch the application and notify the application of identification information of the specific peripheral apparatus,
wherein the application determines whether the specific peripheral apparatus identified by the notified identification information is connected to the information processing apparatus, and sets the specific peripheral apparatus as a processing target peripheral apparatus in a case where the application determines that the specific peripheral apparatus is connected to the information processing apparatus.

2. The information processing apparatus according to claim 1, wherein the application instructs a user to connect the specific peripheral apparatus to the information processing apparatus in a case where the application determines that the specific peripheral apparatus is not connected to the information processing apparatus.

3. The information processing apparatus according to claim 1, wherein the application sets the specific peripheral apparatus as a recovery target peripheral apparatus in a case where the application determines that the specific peripheral apparatus is connected to the information processing apparatus.

4. The information processing apparatus according to claim 1, wherein the control unit is configured to refer to device management control data corresponding to the specific peripheral apparatus and to display the device management screen corresponding to a control target.

5. The information processing apparatus according to claim 1, wherein a number of setting items of the application in a case where the application is instructed to be launched via the device management screen, is less than a number of setting items of the application in a case where the application is instructed to not be launched via the device management screen.

6. A control method for an information processing apparatus, the method comprising:
displaying a device management screen corresponding to a specific peripheral apparatus; and
launching an application and notifying the application of identification information of the specific peripheral apparatus in a case where an instruction for launching the application is input via the device management screen,
wherein the application determines whether the specific peripheral apparatus identified by the notified identification information is connected to the information processing apparatus, and sets the specific peripheral apparatus as a processing target peripheral apparatus in a case where the application determines that the specific peripheral apparatus is connected to the information processing apparatus.

7. The method according to claim 6, wherein the application instructs a user to connect the specific peripheral apparatus to the information processing apparatus in a case where the application determines that the specific peripheral apparatus is not connected to the information processing apparatus.

8. The method according to claim 6, wherein the application sets the specific peripheral apparatus as a recovery target peripheral apparatus in a case where the application determines that the specific peripheral apparatus is connected to the information processing apparatus.

9. The method according to claim 6, further comprising:
referring to device management control data corresponding to the specific peripheral apparatus; and
displaying the device management screen corresponding to a control target.

10. The method according to claim 6, wherein a number of setting items of the application in a case where the application is instructed to be launched via the device management screen, is less than a number of setting items of the application in a case where the application is instructed to not be launched via the device management screen.

11. A non-transitory computer readable storage medium including instructions, operable when executed by a processor, to cause an information processing apparatus to:
display a device management screen corresponding to a specific peripheral apparatus; and
launch an application and notify the application of identification information of the specific peripheral apparatus in a case where an instruction for launching the application is input via the device management screen,
wherein the application determines whether the specific peripheral apparatus identified by the notified identification information is connected to the information processing apparatus, and sets the specific peripheral apparatus as a processing target peripheral apparatus in a case where the application determines that the specific peripheral apparatus is connected to the information processing apparatus.

12. The non-transitory computer readable storage medium according to claim 11, wherein the application instructs a user to connect the specific peripheral apparatus to the information processing apparatus in a case where the application determines that the specific peripheral apparatus is not connected to the information processing apparatus.

13. The non-transitory computer readable storage medium according to claim 11, wherein the application sets the specific peripheral apparatus as a recovery target peripheral apparatus in a case where the application determines that the specific peripheral apparatus is connected to the information processing apparatus.

14. The non-transitory computer readable storage medium according to claim 11, including further instructions to cause the information processing apparatus to:
   refer to device management control data corresponding to the specific peripheral apparatus; and
   display the device management screen corresponding to a control target.

15. The non-transitory computer readable storage medium according to claim 11, wherein a number of setting items of the application in a case where the application is instructed to be launched via the device management screen, is less than a number of setting items of the application in a case where the application is instructed to not be launched via the device management screen.

* * * * *